(12) United States Patent  
Davis et al.

(10) Patent No.: US 7,690,943 B2
(45) Date of Patent: Apr. 6, 2010

(54) BATTERY CONNECTOR

(75) Inventors: Kenneth R. Davis, Grafton, WI (US); Edward N. Mrotek, Grafton, WI (US); Daniel P. Heil, Savannah, MO (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/248,662

(22) Filed: Oct. 9, 2008

(65) Prior Publication Data

US 2009/0035984 A1 Feb. 5, 2009

Related U.S. Application Data

(63) Continuation of application No. 11/703,767, filed on Feb. 8, 2007, now Pat. No. 7,452,235, which is a continuation of application No. 10/900,042, filed on Jul. 27, 2004, now abandoned.

(60) Provisional application No. 60/490,463, filed on Jul. 28, 2003, provisional application No. 60/497,596, filed on Aug. 25, 2003.

(51) Int. Cl.
*H01R 11/00* (2006.01)
(52) U.S. Cl. .................................. 439/504; 439/476.1
(58) Field of Classification Search ................. 439/504, 439/476.1, 502, 626, 759
See application file for complete search history.

(56) References Cited

U.S. PATENT DOCUMENTS

| 2,718,540 | A | | 9/1955 | Betz |
| 2,794,666 | A | | 6/1957 | Bishman |
| 2,816,791 | A | | 12/1957 | Pinkerson |
| 3,377,205 | A | | 4/1968 | Butterworth |
| 4,060,049 | A | * | 11/1977 | Rumbaugh .................... 441/69 |
| 4,288,504 | A | | 9/1981 | Julian et al. |
| 4,607,904 | A | | 8/1986 | D'Alessandro et al. |
| 4,934,958 | A | | 6/1990 | Julian |
| 5,111,130 | A | | 5/1992 | Bates |
| 5,462,453 | A | | 10/1995 | Muller |
| 5,662,497 | A | | 9/1997 | Reilly |
| 6,097,173 | A | | 8/2000 | Bryant |
| 6,176,727 | B1 | * | 1/2001 | Liu et al. .................... 439/358 |
| 6,373,220 | B1 | | 4/2002 | Wipperfurth et al. |
| 6,695,652 | B1 | | 2/2004 | Reardon, Jr. |

* cited by examiner

Primary Examiner—Michael C Zarroli
(74) Attorney, Agent, or Firm—Lathrop & Clark LLP

(57) ABSTRACT

A device for electrically connecting a plurality of batteries includes a member including a handle and two arms extending from the handle. The handle includes a first portion, a second portion spaced apart from the first portion, and a connector extending between the first portion and the second portion. The member also includes a contact coupled to a first of the two arms for contacting at least a portion of a battery terminal when the device is secured to a battery. The first of the two arms is configured for securing the device to a first side of a battery and a second of the two arms is configured for securing the device to a second side of the battery.

7 Claims, 19 Drawing Sheets

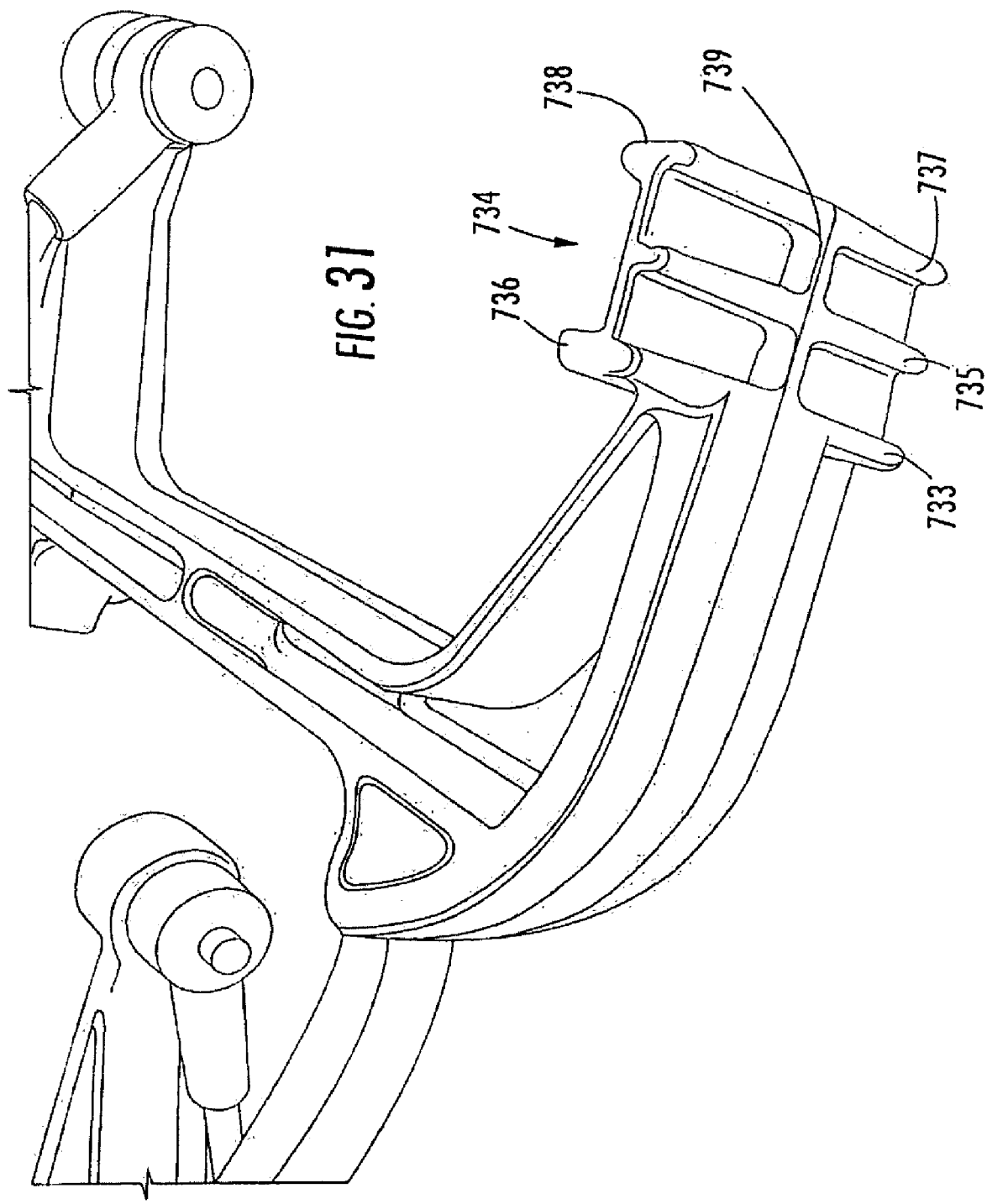

BATTERY CONNECTOR

CROSS-REFERENCE TO RELATED PATENT APPLICATIONS

This application is a Continuation of U.S. patent application Ser. No. 11/703,767 filed Feb. 8, 2007, which is itself a Continuation of U.S. patent application Ser. No. 10/900,042 filed Jul. 27, 2004, which claims the benefit under 35 U.S.C. § 119(e) of U.S. Provisional Application No. 60/490,463, filed Jul. 28, 2003, and U.S. Provisional Application No. 60/497,596, filed Aug. 25, 2003.

The following U.S. Patent Applications are expressly incorporated herein by reference in their entirety: U.S. patent application Ser. No. 11/703,767; U.S. patent application Ser. No. 10/900,042; U.S. Provisional Application No. 60/490,463, filed Jul. 28, 2003, and U.S. Provisional Application No. 60/497,596, filed Aug. 25, 2003.

BACKGROUND

The present invention relates generally to the field of batteries (e.g., lead-acid starting, lighting, and ignition batteries such as those used as automotive batteries) and the manufacturing of such batteries. More specifically, the present inventions relate to connectors for use in battery charging or formation operations with batteries having terminals provided on a side surface of such batteries.

When batteries are initially charged in a manufacturing facility (referred to as battery "formation"), it is generally more efficient to simultaneously charge a number of batteries. Accordingly, a number of batteries are typically electrically connected together in series using wires that include contacts or leads on each end of the wire. The wires and contacts connect a positive terminal of a battery to a negative terminal of an adjacent battery. This process is repeated until all batteries are connected together. The first and last battery in the series have a terminal that is not connected to another battery, but rather to a charging or recharging device. For example, the negative terminal of the first battery and the positive terminal of the last battery in the series may be connected to the charging or recharging device. When the charging or recharging device subsequently provides a charge to the batteries, all connected batteries will be charged simultaneously.

Certain batteries are manufactured such that they include side terminals or bushings. Such bushings may be configured such that the battery terminals may be connected to automobile battery cables by threading a portion of the leads of the battery cables into a threaded aperture provided in the terminals or bushings.

Initial charging of side terminal batteries in manufacturing operations may be difficult in that conventional wires and contacts used to connect a series of batteries together involve a threaded contact that is screwed into the threaded battery terminals or bushings. While such a configuration may provide for a relatively secure connection between the contacts and the terminals, one disadvantage of such a configuration is that the connection of a number of batteries may be relatively inefficient in that time and energy is expended to screw a contact into a threaded aperture and to remove it after charging is complete.

Further, during manufacturing operations, several rows of batteries may be placed adjacent to each other, with each row representing one connected series of batteries. The spacing between such adjacent rows may be such that it is difficult or awkward for an operator to reach between the batteries to screw a contact into the battery terminals.

It would therefore be advantageous to provide an improved system for electrically connecting batteries together for a battery charging operation (e.g., a battery formation operation). It would also be advantageous to provide a system for electrically connecting batteries together that is relatively efficient and that provides a relatively secure coupling between contacts and battery terminals in order to avoid undesirable shorting of batteries during charging. It would also be advantageous to provide a system and/or method for electrically connecting batteries that utilizes a relatively simple device that is resistant to various conditions in a manufacturing facility (e.g., exposure to acid, etc.). It would be advantageous to provide a system and/or a method that may be used to obtain one or more of these or other advantageous features

SUMMARY

An exemplary embodiment relates to a device for electrically connecting a plurality of batteries and includes a member including a handle and two arms extending from the handle. The handle includes a first portion, a second portion spaced apart from the first portion, and a connector extending between the first portion and the second portion. The member also includes a contact coupled to a first of the two arms for contacting at least a portion of a battery terminal when the device is secured to a battery. The first of the two arms is configured for securing the device to a first side of a battery and a second of the two arms is configured for securing the device to a second side of the battery.

Another exemplary embodiment relates to a system for electrically coupling a plurality of batteries together for a battery charging operation. The system includes a first member comprising a handle portion and two arms extending from the handle portion. The handle portion includes a first portion, a second portion spaced apart from the first portion, and a bridge connecting the first portion to the second portion. The system also includes a second member comprising a handle portion and two arms extending from the handle portion. The handle portion includes a first portion, a second portion spaced apart from the first portion, and a bridge connecting the first portion to the second portion. The system also includes a first contact provided on one of the two arms of the first member and configured for engaging a battery terminal and a second contact provided on one of the two arms of the second member and configured for engaging a battery terminal. A cable electrically connects the first contact to the second contact.

Another exemplary embodiment relates to a battery charging arrangement that includes a first battery comprising a positive terminal and a negative terminal and a second battery comprising a positive terminal and a negative terminal. A first member is coupled to the first battery and comprises a handle portion and two arms coupled to the handle portion, the handle portion including a top portion, a bottom portion spaced apart from the top portion, and a bridge connecting the top portion to the bottom portion. A second member is coupled to the second battery and comprises a handle portion and two arms coupled to the handle portion, the handle portion including a top portion, a bottom portion spaced apart from the top portion, and a bridge connecting the top portion to the bottom portion. A first contact is provided on a first of the two arms of the first member and in contact with the positive terminal of the first battery, and a second contact is provided on a first of the two arms of the second member and in contact with the negative terminal of the second battery. A cable electrically connects the first contact to the second contact such that the positive terminal of the first battery is electrically connected to the negative terminal of the second battery.

Another exemplary embodiment relates to a device for electrically connecting a plurality of batteries that includes a member comprising a first portion, a first arm extending from the first portion, and a second arm extending from the first portion. The member also includes a contact coupled to the first arm. The member is configured for coupling to a battery such that the contact engages a terminal provided on a first side of the battery and the second arm engages a second side of the battery.

BRIEF DESCRIPTION OF THE DRAWINGS

FIG. 31 is a perspective view of a portion of the connector shown in FIG. 30 coupled to another similar connector.

DETAILED DESCRIPTION

Figure 1:
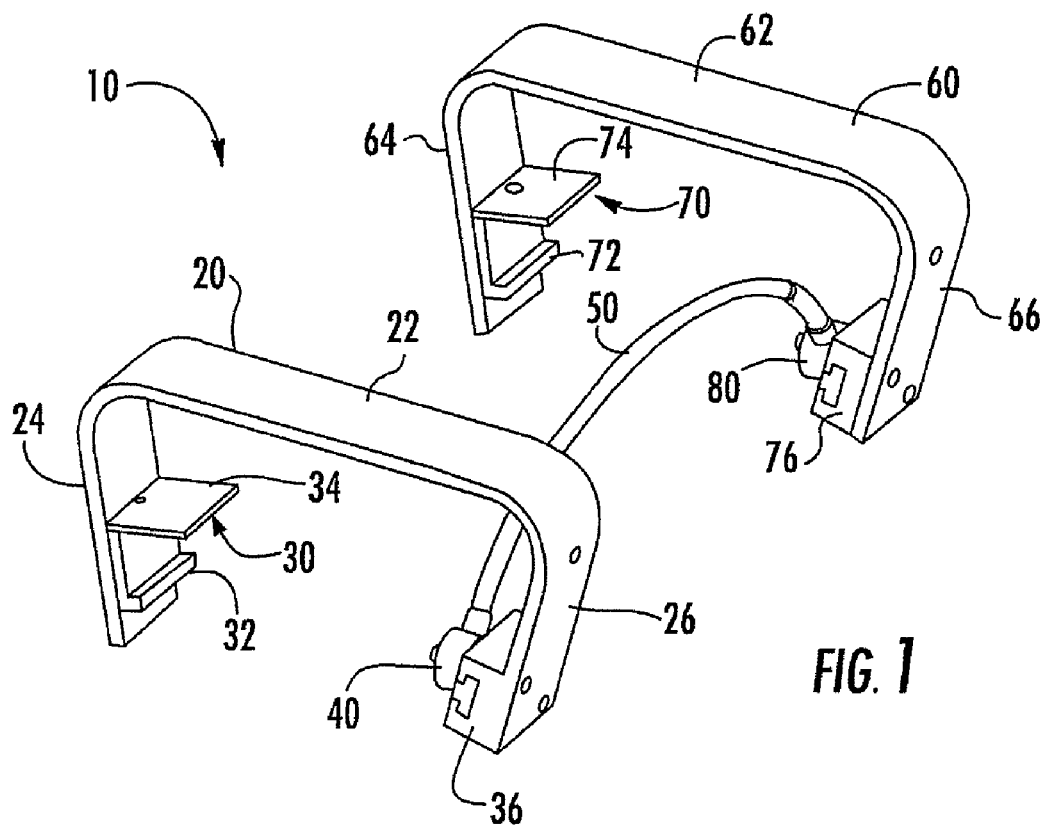
FIG. 1 is a perspective view of a connector (e.g., a battery formation connector) according to an exemplary embodiment.

FIG. 1 shows a system 10 in the form of a battery formation connector that includes at least one member or clip for coupling to a battery. As shown in FIG. 1, two members or clips 20, 60 are shown, and are generally "U-shaped". Member 20 includes a top portion 22 and two arms 24, 26 coupled to top portion 22. Similarly, member 60 includes a top portion 62 and two arms 64, 66 coupled to top portion 62. According to an exemplary embodiment (see e.g., FIG. 1), the arms are integrally formed with the top portion. According to another exemplary embodiment, the arms may be formed separately and coupled to the top portion (e.g., using adhesive, screws, or other fasteners).

At least one of the top portion and the arms are made of a relatively resilient and/or flexible material. According to an exemplary embodiment, the arms and top portion comprise the same material. According to an another exemplary embodiment, at least one of the arms and top portion comprise different materials (e.g., one or both of the arms comprise a relatively flexible material and the top portion comprise a relatively rigid and/or inflexible material).

Arm 26 includes a contact or lead 40 (e.g., an electrical contact) for coupling or attaching (e.g., abutting, interfacing, etc.) to a terminal of a battery when the member is coupled thereto. Arm 60 includes a contact or lead 80 similar to that included with arm 26. According to an exemplary embodiment, contacts 40, 80 comprise elements that have generally cylindrical shapes (see, e.g., FIG. 2). For example, contact 40 includes a first portion 42 having a generally cylindrical shape and a smaller second portion 44 extending from first portion 42 having a generally cylindrical shape, and contact 80 includes a first portion 82 having a generally cylindrical shape and a smaller second portion 84 extending from first portion 82 having a generally cylindrical shape.

According to an exemplary embodiment (see e.g., FIG. 3), the smaller generally cylindrical second portions 44, 84 have a relatively smooth surface. According to another exemplary embodiment, the smaller generally cylindrical second portions 44, 84 may include features such as ribs, threads, or other features provided thereon.

When members 20, 60 are coupled to battery terminals or bushings, the portions 44, 84 are inserted into openings or apertures provided in the terminal of the battery (e.g., a bushing type terminal). The face of the first portions 42, 82 abut the face of the terminals to provide metal-to-metal contact between the contacts and the terminals.

According to an exemplary embodiment (see e.g., FIGS. 2-3), each of members 20, 60 includes a member 36, 76 for securing contacts 40, 80 thereto. For example, contact 40 includes a protrusion 46 having a geometry such that the protrusion may serve as a ball in a ball-and-socket type joint (contact 80 includes a similar protrusion, not shown). In such case, contact 40 is coupled to member 36 by positioning the protrusion in a channel 37 (e.g., a "T" shaped channel) that is provided in member 36. Member 36 is secured to arm 26 with fasteners 38, 39, and according to other exemplary embodiments, may be secured thereto using adhesives or other fasteners or may be integrally formed therewith.

Figure 2:
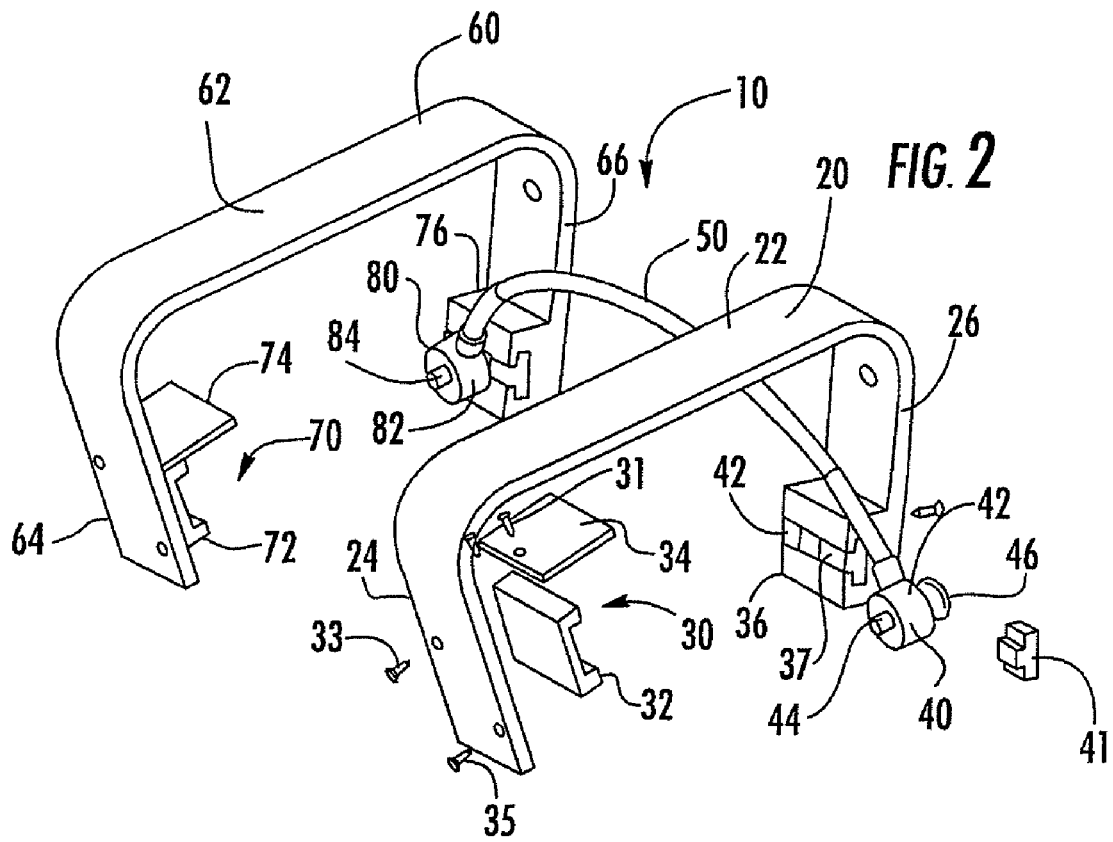
FIG. 2 is a partially exploded perspective view of the connector shown in FIG. 1.

Channel 37 is provided with inserts 41, 42 to allow contact 40 a limited range of motion and to prevent contact 42 from sliding out of channel 37 (see e.g., FIG. 2). This range of motion allows for a good electrical connection between contact 40 and a terminal of a battery while the member is in a variety of positions relative to the battery. Also, the range of motion allows the same system to be used with batteries of various size.

According to another exemplary embodiment, the contact may lack a protrusion of the type described and may be coupled to member 36 by fasteners (e.g., screws, rivets, or bolts).

To couple a member to a battery (e.g., a lead acid battery having side terminals or bushings), the arm having a contact provided thereon is provided on the battery such that the contact abuts or is coupled to a battery terminal and the other arm is secured or compressed against a surface of the battery. According to another exemplary embodiment, one arm is provided adjacent a first side of the battery and the other arm is provided adjacent a second side of the battery (e.g., the opposite side of the battery in relation to the side of the battery having a terminal provided thereon).

Figure 6:
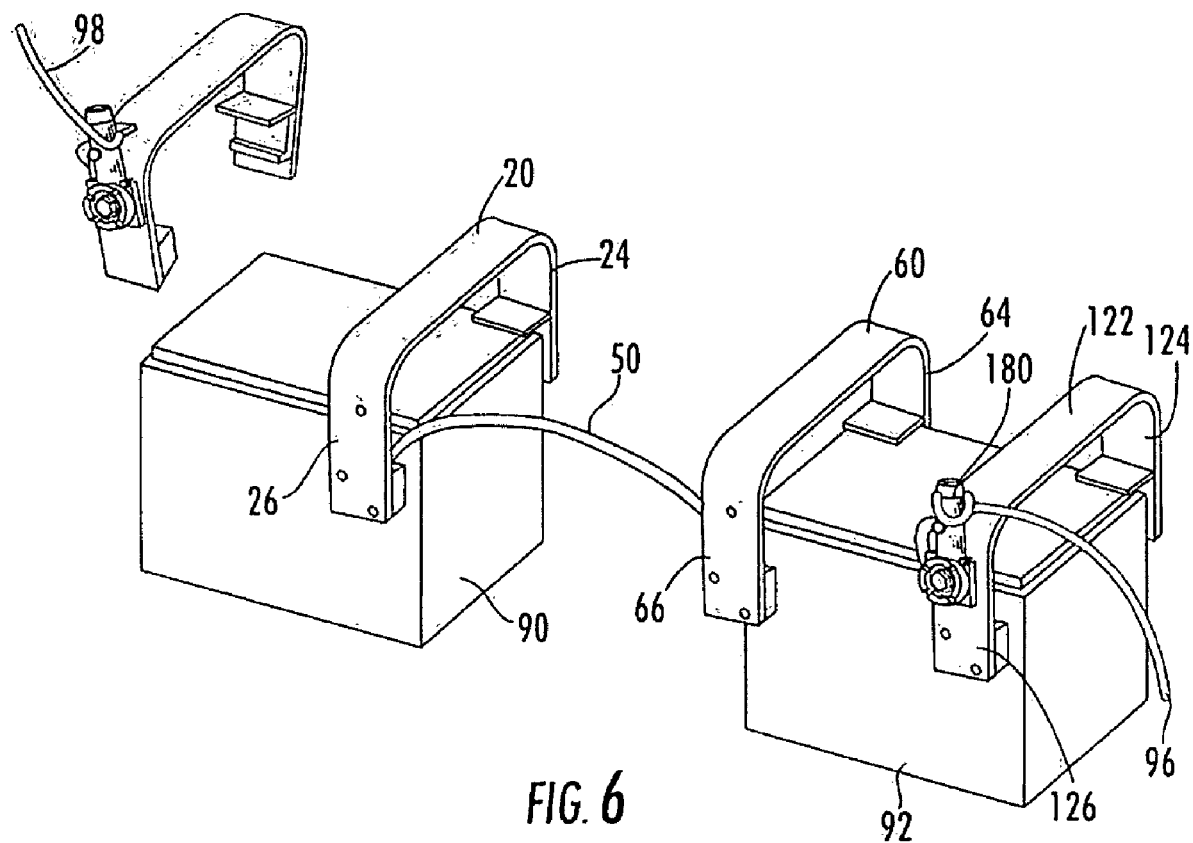
FIG. 6 is a perspective view showing batteries and connectors coupled together in a battery formation operation.

While the member is coupled to a battery, the top portion of the member extends over the top of the battery and is substantially parallel to the top of the battery, while the arms of the member are substantially parallel to the front and back of the battery respectively (see e.g., FIG. 6).

In battery formation operations, one member is coupled to a first battery, while the other member is coupled to a second battery. For example, as shown in FIG. 6, member 20 is coupled to a battery 90 and member 60 is coupled to a battery 92. Contact 40 of member 20 is coupled to a negative terminal or bushing (not shown) of battery 90, while contact 80 of member 60 is coupled to a positive terminal or bushing (not shown) of battery 92. System 10 includes a wire or cable 50 (e.g., a rubber or plastic clad wire) that electrically couples contact 40 to contact 80 (e.g., allows current flow between contact 40 and contact 80, and hence, between the battery terminals to which such contacts may be coupled by way of the electrical connection provided therebetween).

Each of the members also includes a member in the form of a brace or bracket for securing the member to the side of the battery opposite the side of the battery having the terminals. For example, member 20 includes a brace 30 having a base 32 and an extension 34 coupled to base 32. According to an exemplary embodiment, base 32 is coupled to arm 24 by fasteners 33, 35 (e.g., screws, rivets, bolts, etc.). According to another exemplary embodiment, base 32 may be secured to arm 24 using other means (e.g., adhesive, etc.) or may be integrally formed as part of arm 24 (e.g., arm 24 may be injection molded as a single piece). Extension 34 is coupled or secured to base 32 by a fastener 31 (e.g., a screw, a rivet, a bolt, etc.). According to another exemplary embodiment, extension 34 may be secured to base 32 using other means (e.g., adhesive, etc.) or may be integrally formed as part of base 32 or arm 24. Member 60 also includes a brace or bracket 70 having a base 72 and an extension 74. Base 72 and extension 74 may be secured to arm 64 similar to the ways described with respect to brace 30.

The extensions included in the braces act to contact a top surface of a battery housing to prevent the members (e.g., members 20, 60) from moving downward with respect to the battery housing. The base included in the braces act to contact or engage a feature such as a lip or groove formed at the top of the battery housing to prevent the members (e.g., members 20, 60) from moving upward with respect to the battery housing.

According to other exemplary embodiments the extension, base, or both may be omitted or a brace in the form of a block with a flat or textured surface may be used. In either case, the force exerted by the member creates enough friction or clamping force (e.g., a compressive force) against the battery to prevent the member from moving with respect to the battery housing.

The members and braces may comprise polymeric materials, metals, or any other material that is relatively flexible, sufficiently strong, and suitable for an acidic environment.

As described, system 10 is configured to couple a pair of batteries together (and, in practice, multiple systems may be used to couple more than two batteries in series). In such an arrangement, all of the battery terminals are coupled to a contact, such that the batteries are connected in series (e.g., the positive terminal of one battery is coupled to the negative terminal of an adjacent battery), except for the positive terminal of a battery at one end of the group of batteries, and the negative terminal of a battery at the other end of the group (see e.g., FIG. 6). According to an exemplary embodiment, 15 to 20 batteries may be connected in series during a battery charging operation. According to other exemplary embodiments, a greater or lesser number of batteries are connected to accommodate various charging and recharging devices.

Connecting a group of batteries requires a number of connectors (e.g., such as system 10) equal to the number of batteries in the group less one (i.e., it would require 14 connectors to link 15 batteries). The system can be configured to electrically couple a group of batteries where the group may consist of any number of batteries.

Figure 3:
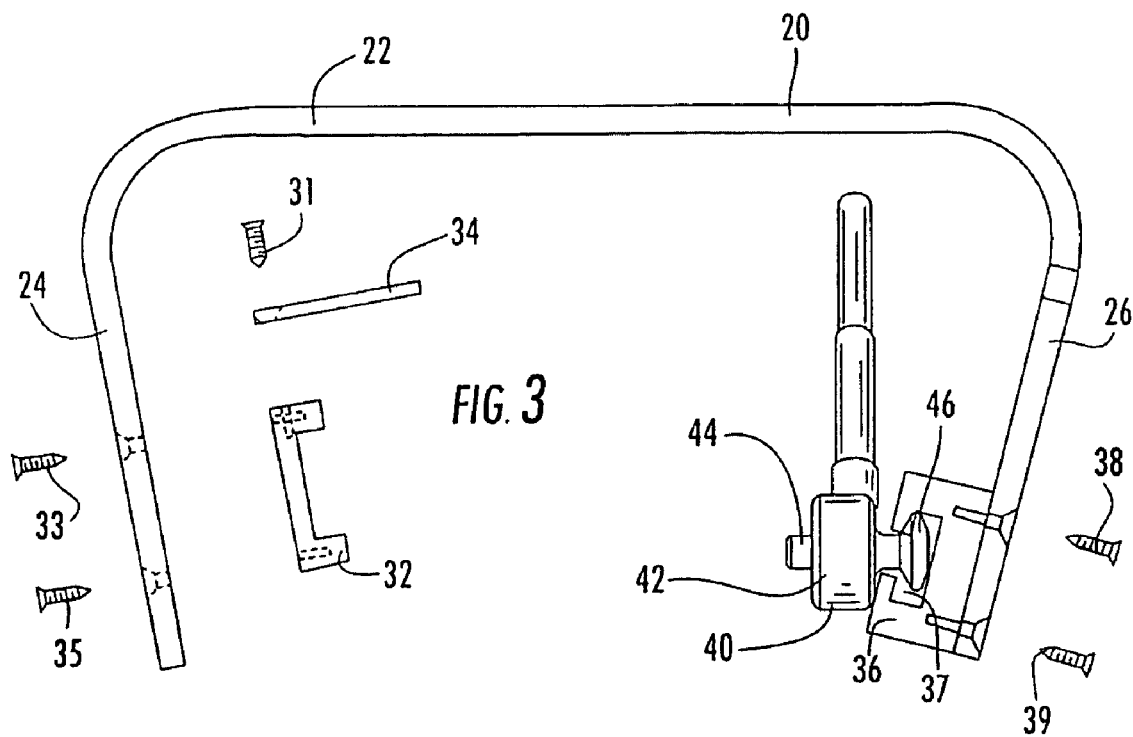
FIG. 3 is an exploded plan view of a portion of the connector shown in FIG. 1.
Figure 4:
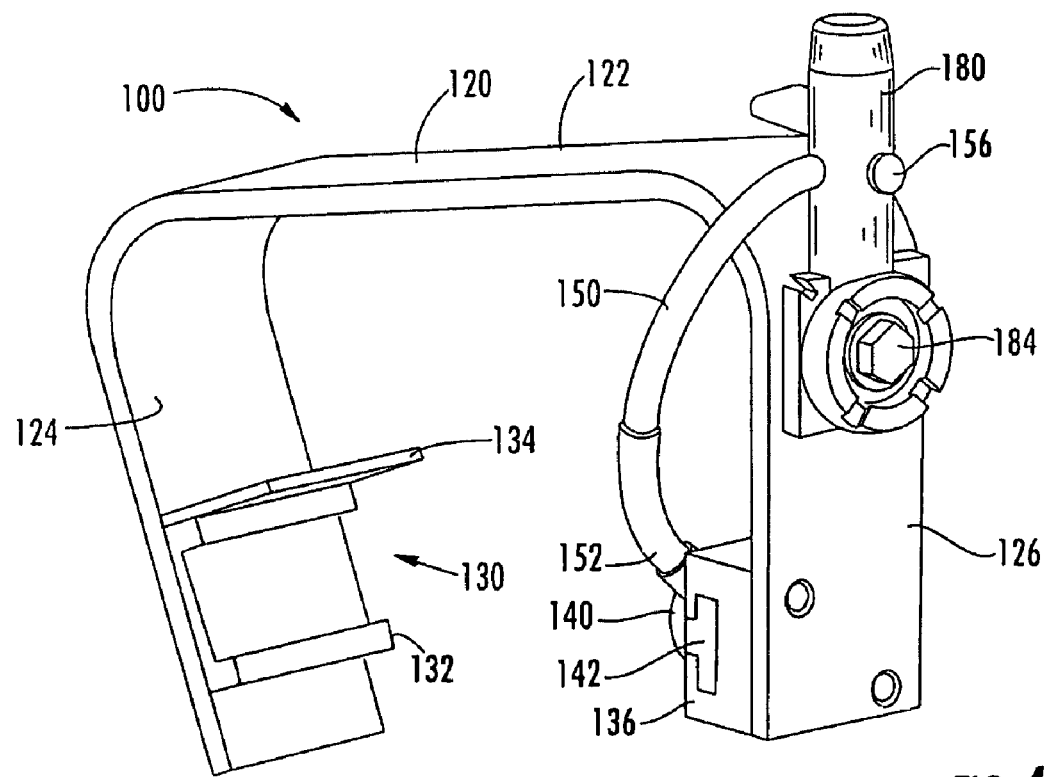
FIG. 4 is a perspective view of a connector according to another exemplary embodiment.
Figure 5:
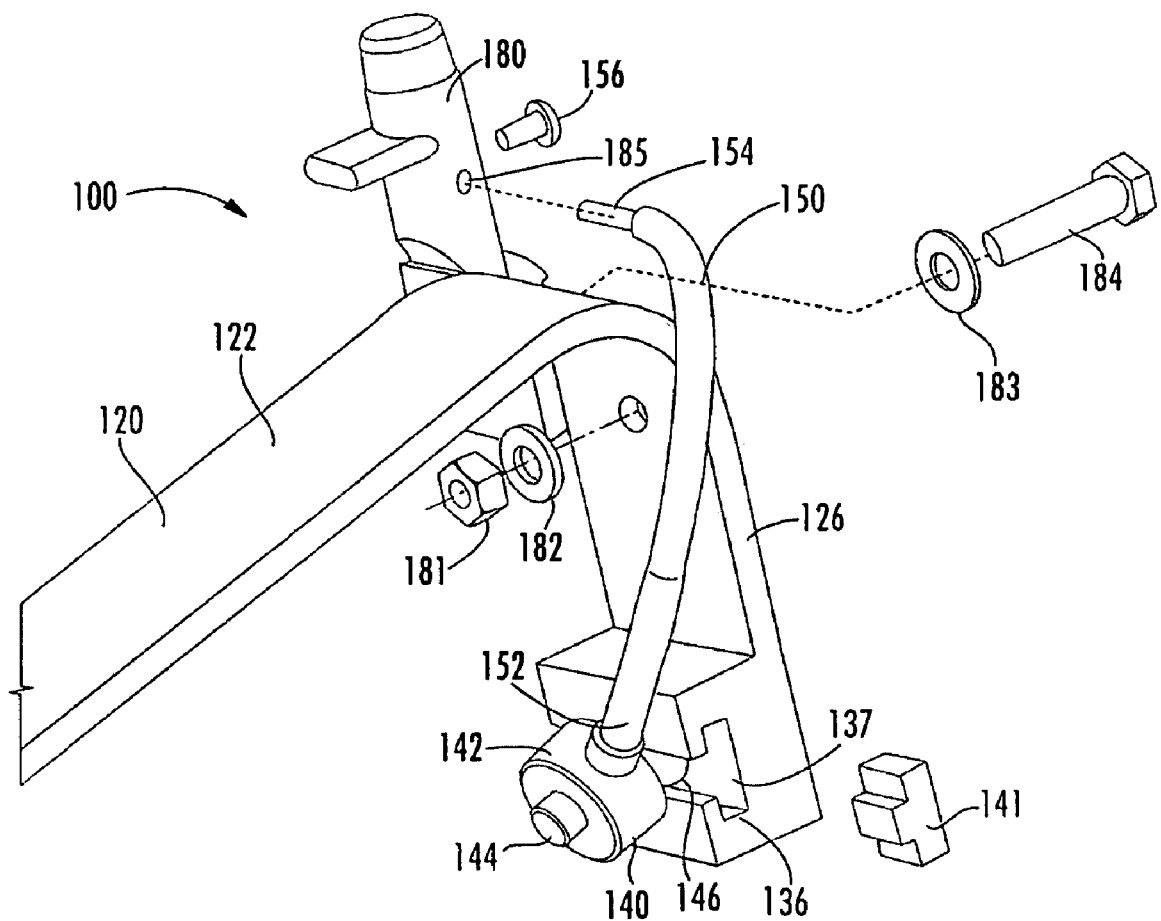
FIG. 5 is an exploded perspective view of a portion of the connector shown in FIG. 4.

While FIGS. 1-3 illustrate a system 10 for electrically connecting terminals of adjacent batteries together during battery charging and/or testing, FIGS. 4-5 illustrate a system 100 (e.g., a connector) configured for connecting a series of batteries to a charging or recharging device (e.g., a battery charging system or charger) (see e.g., FIG. 6).

Connector 100 includes a member 120 having arms 124, 126 and a top portion 122. A brace 130 having a base 132 and a top portion 134 is coupled to arm 124, and a member 136 having a channel 137 provided therein for receiving a protrusion 146 of a contact 140 (having a first portion 142 and a second portion 144, each of which is generally cylindrical), which is held in place by a plug or insert 141.

Connector 100 includes a post or terminal 180 for electrically coupling the group of batteries to a charging or recharging device via a wire or cable (see e.g., wires 96 and 98 in FIG. 6). According to an exemplary embodiment (see e.g., FIG. 4), post 180 is oriented vertically (e.g., parallel to arm 126) and coupled to the outer surface of arm 126 which is parallel to the front side of the battery housing by fasteners 181, 182, 183, 184 (e.g., a bolt, nut, and washers, etc.). Other means of coupling post 180 may also be used according to various other exemplary embodiments.

A wire or cable 150 is coupled to contact 140 at a first end 152 and to post 180 at a second end 154. Wire 150 may be inserted into an aperture 185 provided in post 180 and secured therein using a fastener 156. In this manner, contact 140 may be electrically coupled to post 180, which may act to provide an electrical connection between a terminal of a battery and a charging or recharging device (see, e.g., FIG. 6). In the event that connector 100 comprises a conductive material (e.g., a metal) for arms 124 and 126 and/or top portion 122, an insulating material may be used to separate connector 100 and post 180.

Figure 7A:
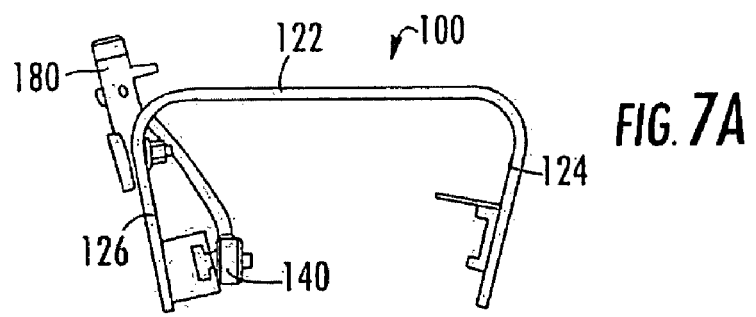
FIG. 7A shows a connector prior to installation on a battery according to an exemplary embodiment.
Figure 7B:
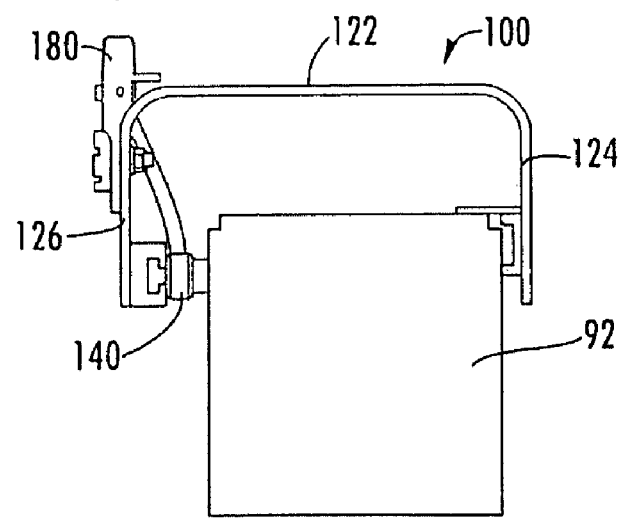
FIG. 7B shows the connector shown in FIG. 7A installed on a battery according to an exemplary embodiment.

FIGS. 7A-7B illustrate the attachment of connector 100 to a battery 92. As shown in FIG. 7A, prior to installation of connector 100 on battery 92, arms 124, 126 flex inward toward each other. Due to the freedom of movement allowed contact 140 by virtue of the provision of protrusion 146 within channel 137, connector 140 is allowed to move relative to arm 126. Upon installation of connector 100 on battery 92, arms 124, 126 are flexed away from each other, thus providing a clamping force on sides of the battery to secure connector 100 in place relative to battery 92.

A system such as that described above (e.g., system 10) in the form of a connector for battery formation may be used to electrically connect a group of batteries in series to facilitate charging and/or recharging of the batteries. After the batteries are charged, the system is removed from the batteries.

According to an exemplary embodiment, between 15 and 20 batteries are connected in series for formation. In a production facility, typically a large table is used to provide a water bath (e.g. a pool of water for cooling the batteries during formation) for the batteries during formation. A group of 15 to 20 batteries are connected in series and the group of batteries is arranged in a row. Three groups of batteries forming three rows occupy the table. Each group is connected to a charging or recharging device (i.e., there are three charging and/or recharging devices), and all three groups are charged simultaneously. The present system allows for easier and faster connections to be made and broken, thus lowering the time and labor required for the formation process. The present system may also be used in different arrangements to accommodate a variety of production environments. For example, the system may be used without a water bath, and/or with a different number of batteries in each group, and/or with a different number of battery groups.

Figure 8:
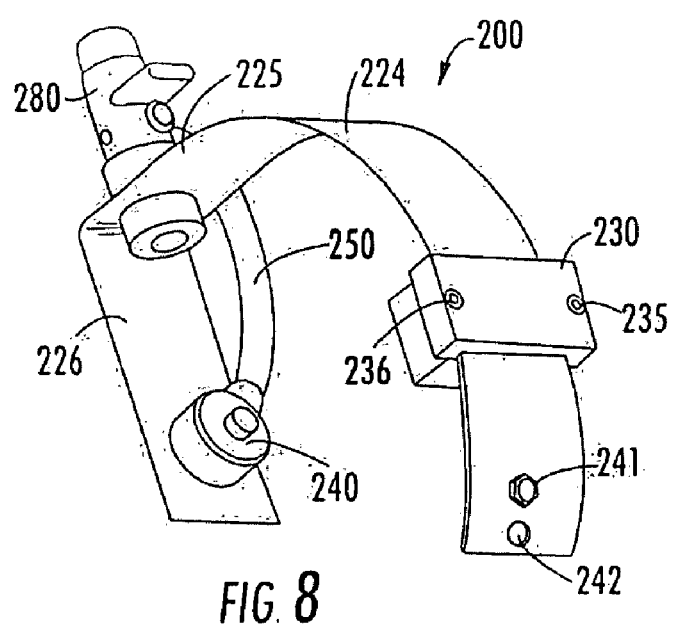
FIG. 8 is a perspective view of a connector according to another exemplary embodiment.
Figure 9:
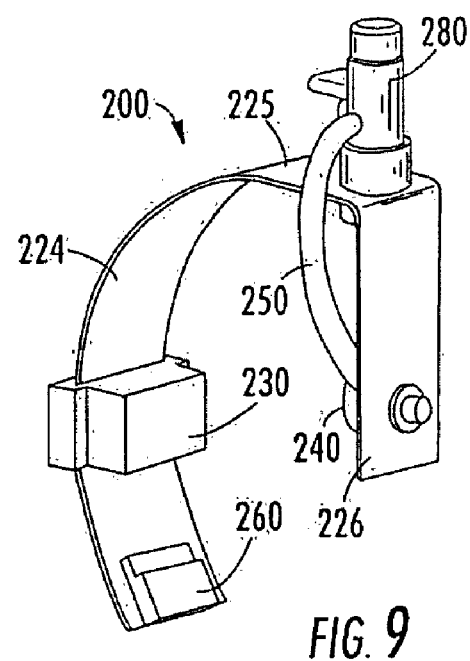
FIG. 9 is another perspective view of the connector shown in FIG. 8.
Figure 10:
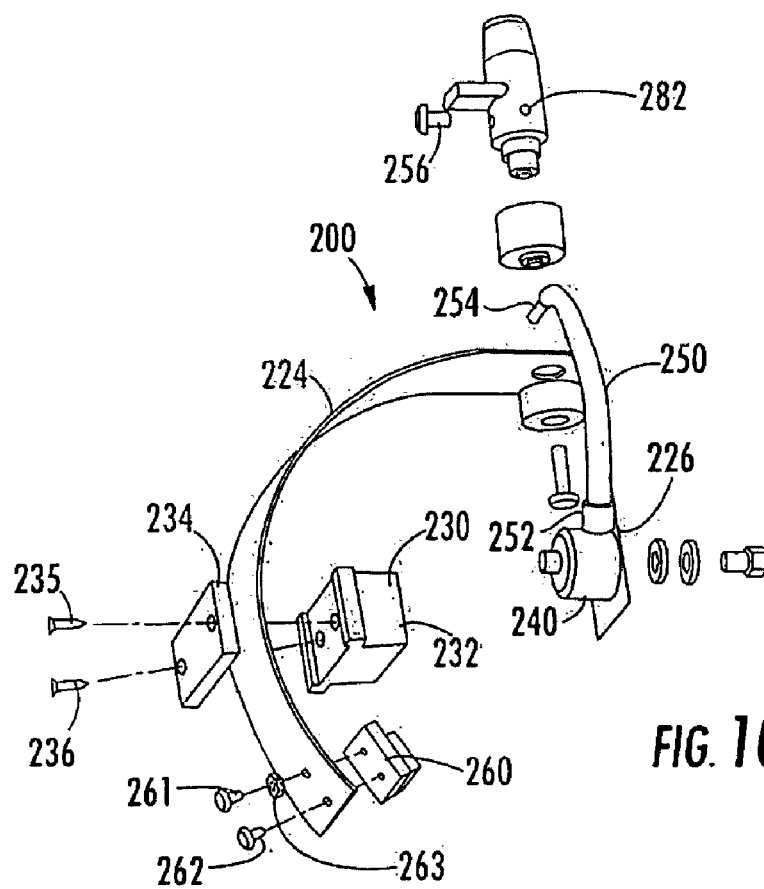
FIG. 10 is an exploded view of the connector shown in FIG. 8.

According to various other exemplary embodiments, the connectors may have different configurations. As shown in FIGS. 8-10, a connector 200 (in the form of a connector configured to couple a battery terminal to a charging or recharging device; according to other exemplary embodiments, connectors such as connector 200 may be coupled together, with a wire extending between their contacts) may include an arm 226 and an arm 224, with arm 224 having a generally curved shape extending away from arm 226. Arms 224 and 226 may be made of metal or another relatively resilient and/or flexible material. Connector 200 may be configured such that arm 226 is provided substantially parallel to a side of the battery (e.g., the side having a terminal provided thereon), and the rounded arm 224 defines a curve that ends in a portion that is substantially parallel to a second side of the battery when connector 200 is installed on a battery. Braces or brackets 230, 260 are provided to secure arm 224 to a side of a battery. Brace 230 includes a first portion 232 and a second portion 234 that act to sandwich a portion of arm 224 therebetween, and are held in place by fasteners 235, 236. Brace 260 may be secured to arm 224 using fasteners 261, 262, and 263. Other fasteners may be used to couple braces 230 and 260 to arm 224, or braces 230, 260 may be integrally formed with arm 224.

A post 280 is coupled or secured to arm 224 at a top portion 225 thereof, and is electrically connected to a contact 240 configured for coupling to a terminal or bushing of a battery. A wire 250 is coupled to contact 240 at a first end 252 and to post 280 at a second end 254 (end 254 may be inserted into an aperture 282 of post 280 and secured in place by a fastener 256).

Figure 11:
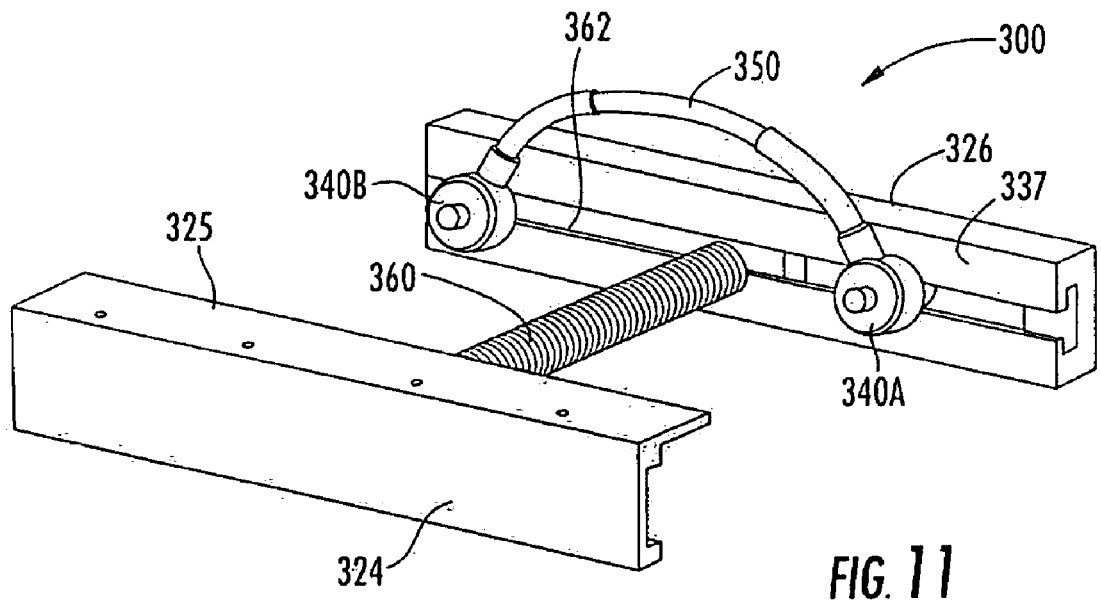
FIG. 11 is a perspective view of a connector according to another exemplary embodiment.
Figure 12:
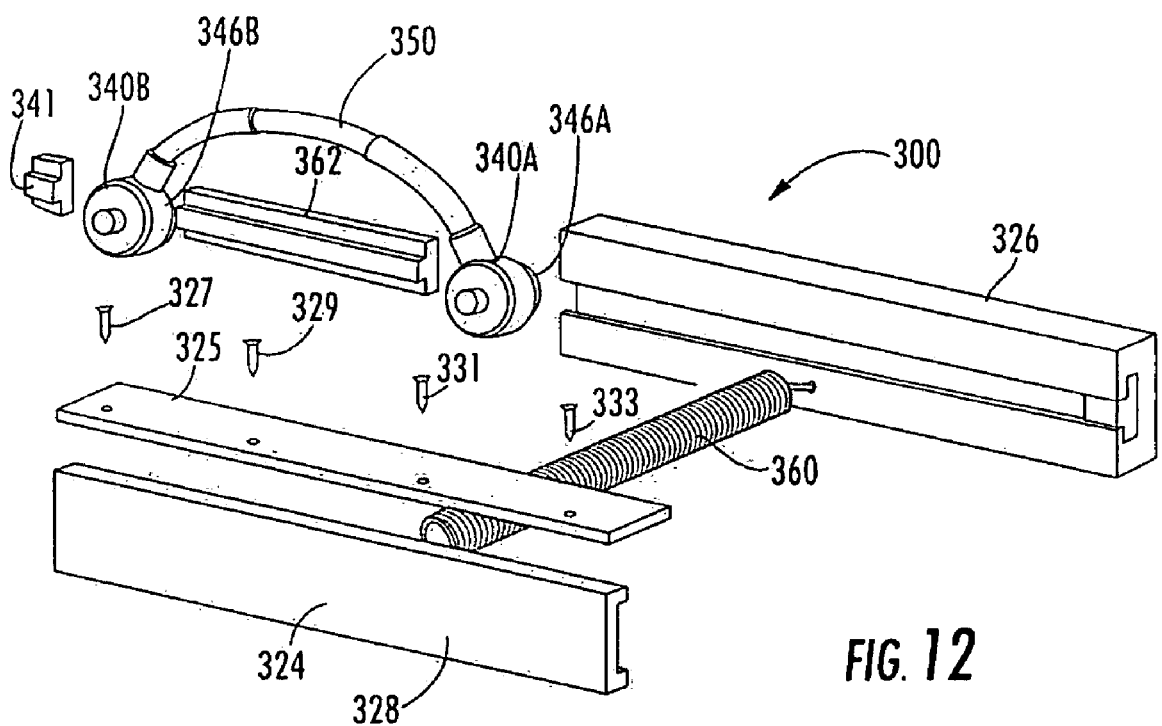
FIG. 12 is an exploded perspective view of connector shown in FIG. 11.

According to another embodiment (see e.g., FIGS. 11-12), a system may have two or more members or segments 324, 326 that contact either the front or back of two or more batteries, wherein the rigid members are coupled together by a coupling component 360 (e.g., a spring or an elastic material such as rubber, with ends coupled to the members and extending between the batteries, or by a fastener such as a bolt extending through at least one member whereby the two members can be tightened against the battery by tightening a nut) (see e.g., FIG. 11). According to an exemplary embodiment, the members or segments 324, 326 comprise a relatively rigid (e.g., non-flexible) material. According to other exemplary embodiments, the members or segments comprise a flexible material.

Member 324 includes a base portion 328 having a brace or extension 325 coupled thereto (e.g., using fasteners 327, 329, 331, 333 or other means). Member 326 includes a channel 337 formed therein for receiving protrusions 346A and 346B of contacts 340A and 340B. A wire or cable 350 connects contacts 340A and 340B, and a separator or divider 362 is provided in channel 337 between protrusions 346A and 346B of contacts 340A and 340B. An insert or plug 341 is provided to contain connectors 340A and 340B and separator 362 within channel 337. In use, contact 340A may be coupled to a terminal of a first battery, with contact 340B coupled to a terminal of a second battery. Coupling component 360 may be stretched to allow arms 324, 326 to be positioned on adjacent batteries to allow coupling between contacts 340A and 340B and the battery terminals or bushings.

The systems as described above are intended to provide a relatively efficient and convenient connector for use in a manufacturing facility. The system includes members that may be connected to and disconnected from batteries in a relatively quick and easy manner, which is intended to provide increased manufacturing efficiency.

With reference to FIGS. 1-7, for example, according to an exemplary embodiment, a contact (e.g., contact 40) is aligned with a negative bushing or terminal on a front side of a battery (e.g., battery 90). The contact includes a surface that abuts or is in contact with at least a portion of the bushing or terminal. This abutment is maintained during charging of the batteries to provide an electrical connection by virtue of the contact between the metal contact and bushing. A force is then be applied to the member (e.g., member 20) whereby the member is flexed such that the member is secured to the back side of the battery (see e.g., FIG. 6). The process is then repeated such that the second contact (e.g., contact 80) is coupled to the positive bushing terminal of another battery (e.g., battery 92), thus connecting the two batteries in series (see e.g., FIG. 6). According to another exemplary embodiment, the members are attached to the back of the batteries (i.e., the side opposite the battery terminals) before the contact is attached to the terminal.

When the connector is coupled to a pair of batteries (or multiple systems are used to couple more than two batteries in series), all the battery terminals are coupled to a contact, such that the batteries are connected in series (e.g., the positive terminal of one battery is coupled to the negative terminal of an adjacent battery), except for the positive terminal of a battery at one end of the group, and the negative terminal of a battery at the other end of the group (see e.g., FIG. 6). According to an exemplary embodiment, 15 to 20 batteries are so connected in the formation process. According to alternative embodiments, a greater or lesser number of batteries are so connected to accommodate various charging and recharging devices.

A connector (e.g., connector 100) is coupled to the positive terminal of a battery at one end of the group of batteries, and another such connector is coupled to the negative terminal of a battery at the other end of the group to couple the battery group to a charging or recharging device. Such connectors include a post (e.g., post 180) to electrically couple the group of batteries to a charging or recharging device via one or more wires or cables (see e.g., wires or cables 96, 98 in FIG. 6).

According to another exemplary embodiment, the system does not have connectors for coupling to the charging or recharging device. Rather, the charging or recharging device is coupled directly to the two open terminals of the battery group (e.g., by a wire).

The sequence in which the devices to secure the connector and terminal connectors to the battery are attached to the battery may be varied. The operation of attaching the connectors to the batteries may be carried out by a human operator or by a machine. One or both of the terminal connectors may be omitted, such that the charging or recharging device is coupled to the battery terminals that would have been coupled to the terminal connectors.

The members comprise any polymeric material (e.g., polyethylene or poly propylene) or metal that is suitably strong, flexible, returns to its original shape after flexing and is suitable for use in an acidic environment. The braces, blocks, and inserts comprise any polymeric material or metal that is suitably strong. The contacts comprise any suitable conductive metal (e.g., lead) or other conductive material, and the wire or cable between the contacts may be any suitable conductive metal (e.g., copper). The members, braces, blocks and inserts may comprise the same material or they may comprise different materials.

The members, braces, and blocks are formed independently and connected by fasteners (see e.g., FIG. 2). The channel (alternatively the groove, slot, or aperture) in the block (see e.g., FIG. 2) or in the member (see e.g., FIG. 11) is made by use of a mold or by removing material from a solid piece.

According to an exemplary embodiment (see e.g., FIG. 1), the system is comprised of materials and/or has a construction that is intended to suitably withstand the effects of a manufacturing environment that may include acids, voltage and other elements that may promote corrosion.

Figure 13:
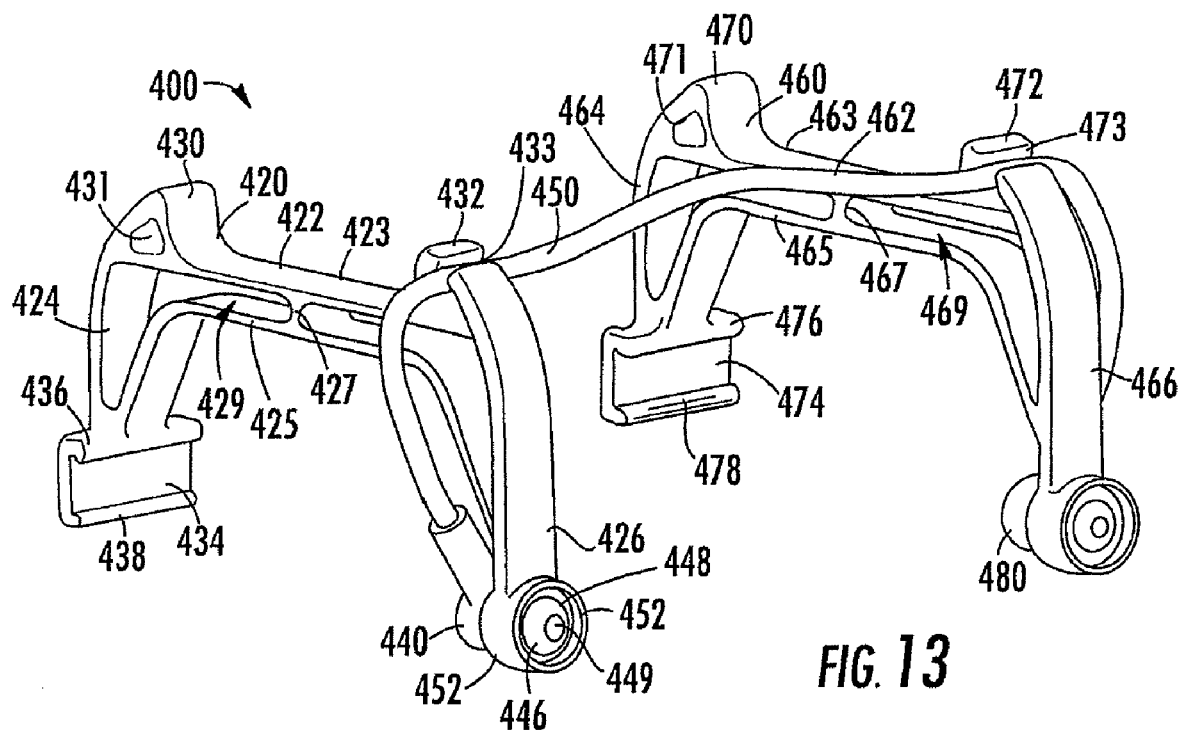
FIG. 13 is a perspective view of a connector according to another exemplary embodiment.

Another exemplary embodiment is shown in FIG. 13, in which a system or connector 400 in the form of a battery formation connector includes at least one member or clip (e.g., a generally "U-shaped" member) for coupling to a battery. As shown in FIG. 13, system 400 includes two members 420, 460, each of which includes a handle or gripping portion (shown as handles 422 and 462). For purposes of the following discussion, it should be noted that features described with respect to one of members 422, 462 may also be provided on the other of the members, and it is in no way intended to limit the inclusion of such features on only one of the two or more members.

According to an exemplary embodiment, handle portion 422, 462 includes a top or upper portion or member 423, 463. Handle portion 422, 462 also includes a bottom or lower portion or member 425, 465 and a bridge or connector 427, 467 for connecting or coupling top portion 423, 463 to bottom portion 425, 465.

A space or aperture 429, 469 is provided between top portion 423, 463 and bottom portion 425, 465 according to an exemplary embodiment. Such space allows production of the member with less material than if the handle portion 422, 462 were produced from a solid piece of material. According to another exemplary embodiment, the handle portion may be produced from a single piece of material instead of having a top portion and a lower portion connected by a bridge with an aperture provided between the top portion and the bottom portion.

Members 420, 460 include one or more projections extending from a top surface thereof (e.g., from top members 423, 463). For example, member 420 includes projections 430 and 432, while member 460 includes projections 470 and 472. The projections may act as stops to prevent the hand of a user or operator from slipping or moving beyond a certain point when handle portions 422, 462 are being gripped or held. According to other exemplary embodiments, the members may include only one projection or another number of projections.

One or more of the projections may have apertures, voids, or channels formed therein. For example, projection 430 includes an associated aperture or void 431, projection 432 includes an associated channel 433, projection 470 includes an associated aperture or void 471, and projection 472 includes an associated channel 473. According to an exemplary embodiment, a channel provided in a projection (e.g., channels 433, 473) may act as a guide for a cable or wire 450 (see, e.g., FIGS. 13-14).

According to an exemplary embodiment, top portion 423, 463 is coupled to bottom portion 425, 465 by a connector in the form of a bridge 427, 467 which is integrally formed with top portion 423, 463 and bottom portion 425, 465 between arms of the members (e.g., arms 424 and 426 of member 420 and arms 464 and 466 of member 460). According to other exemplary embodiments, the top portion and bottom portion may be coupled together by other structures (i.e., in place of the or in conjunction with the bridge) such as fasteners (e.g., screws, bolts, adhesives, etc.), brackets, etc. According to another alternative embodiment, the top portion and the bottom portion may not be coupled together at any point between the arms. One advantageous feature of providing members having configurations such as members 420, 460 is that the handle portions and arms may be more likely to withstand repeated usage as compared to the embodiment shown, for example, in FIG. 1. For example, the configuration shown in FIG. 13 may provide for enhanced rigidity and more resilient flexibility of the members to allow the members to return to their original shape once removed from a battery.

According to an exemplary embodiment, the arms (e.g., arms 424, 426) extend from the handle portion (e.g., handle portion 422) in such a manner as to form a member having a generally "U-shaped" configuration (see, e.g., FIG. 13). According to other exemplary embodiments, other shapes and configurations for the arms may be provided than those shown in the accompanying FIGURES.

Members 420, 460 include at least one element or member in the form of a brace 434, 474 coupled to one of the arms (e.g., arm 424 for member 420 and arm 464 for member 460 as shown in FIG. 13) for securing member 420, 460 to a side of a battery opposite the side with a terminal.

According to an exemplary embodiment (see, e.g., FIG. 20), the arm which is provided adjacent (e.g., substantially parallel) to the back surface of the battery when the member is installed on the battery is secured to the back of the battery (e.g., the side of the battery opposite the side of the battery on which the terminal is provided) by a device such as a brace (shown in the form of a bracket).

Brace 434, 474 includes an extension 436, 476 that contacts a top surface of a battery housing, fits in a groove in the battery housing, or contacts some other surface of the battery housing to prevent the member (or a portion thereof) from moving downward with respect to the battery housing. Brace 434, 474 also has a base 438, 478 that contacts a feature such as a lip formed at the top of the battery housing or that fits in a groove in the back surface of the housing to prevent the flexible member from moving upward with respect to the battery housing.

According to other exemplary embodiments, at least one of the extension and base may be omitted or a brace in the form of a block with a flat or textured surface may be used. In either case, the force exerted by the member creates a sufficient amount of friction or clamping force (e.g., a compressive force) to prevent the member from moving with respect to the battery housing.

According to an exemplary embodiment (see, e.g., FIG. 13) braces 434, 474 are integrally formed with arms 424, 464. According to other exemplary embodiments, the brace may be formed separately and secured to the arm by fasteners (e.g., screws, rivets, bolts, adhesives, etc.).

According to an exemplary embodiment, the brace comprises the same material as the arm to which it is coupled. According to other exemplary embodiments, the brace and member may comprise other polymeric materials, metals, or any other material that is suitable for a battery production environment.

A contact or lead 440, 480 (e.g., an electrical contact) for coupling or attaching (e.g., abutting) to a terminal of a battery (e.g., a side terminal automotive battery) is provided (e.g., secured or fastened within) a coupler provided on one of the arms of the member. According to an exemplary embodiment, the contact or lead is made of lead (Pb) or a lead alloy. Conventionally, battery terminals (e.g., side terminals or bushings) are also made of lead or a lead alloy.

According to an exemplary embodiment (see, e.g., FIG. 14), contact 440, 480 includes a base 442, 482 (shown as having a generally cylindrical shape) from which a plurality of members in the form of protrusions or extensions may extend. For example, base 442 has a protrusion 444 and a protrusion 446 extending therefrom, while base 482 has a protrusion 484 and a protrusion 486 extending therefrom.

According to an exemplary embodiment, a portion of the base (e.g., a face) is provided to abut or contact a portion of a terminal or bushing of a battery to provide an electrical (metal-to-metal) contact between the contact and the terminal or bushing. The face of the contact has a size and shape configured to abut with the terminal or bushing (e.g., where the terminal has a relatively flat portion, the portion of the contact configured to abut the portion of the terminal also has a relatively flat configuration).

According to an exemplary embodiment, the base (e.g., base 442) has a front or forward surface 443 that is generally concave (e.g., extends inward from protrusion 444). According to another exemplary embodiment, the front or forward surface may be relatively planar or may be relatively convex.

Figure 16:
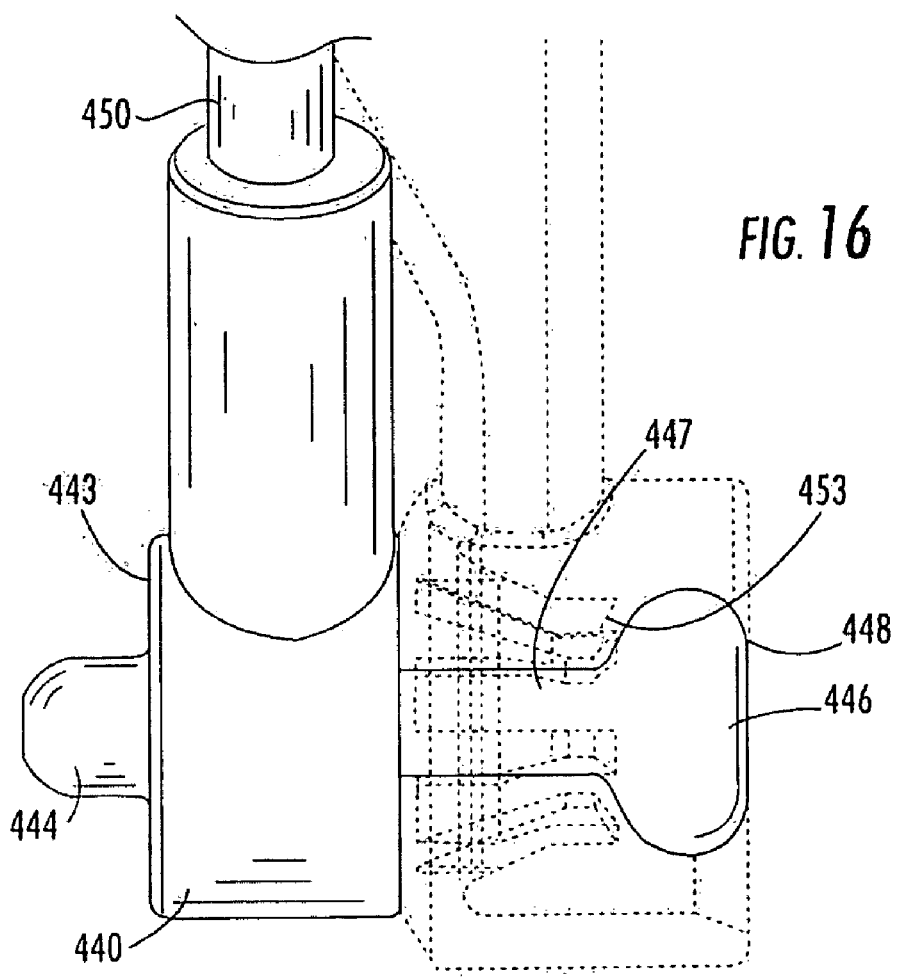
FIG. 16 is another schematic plan view of a portion of the connector shown in FIG. 15.
Figure 21:
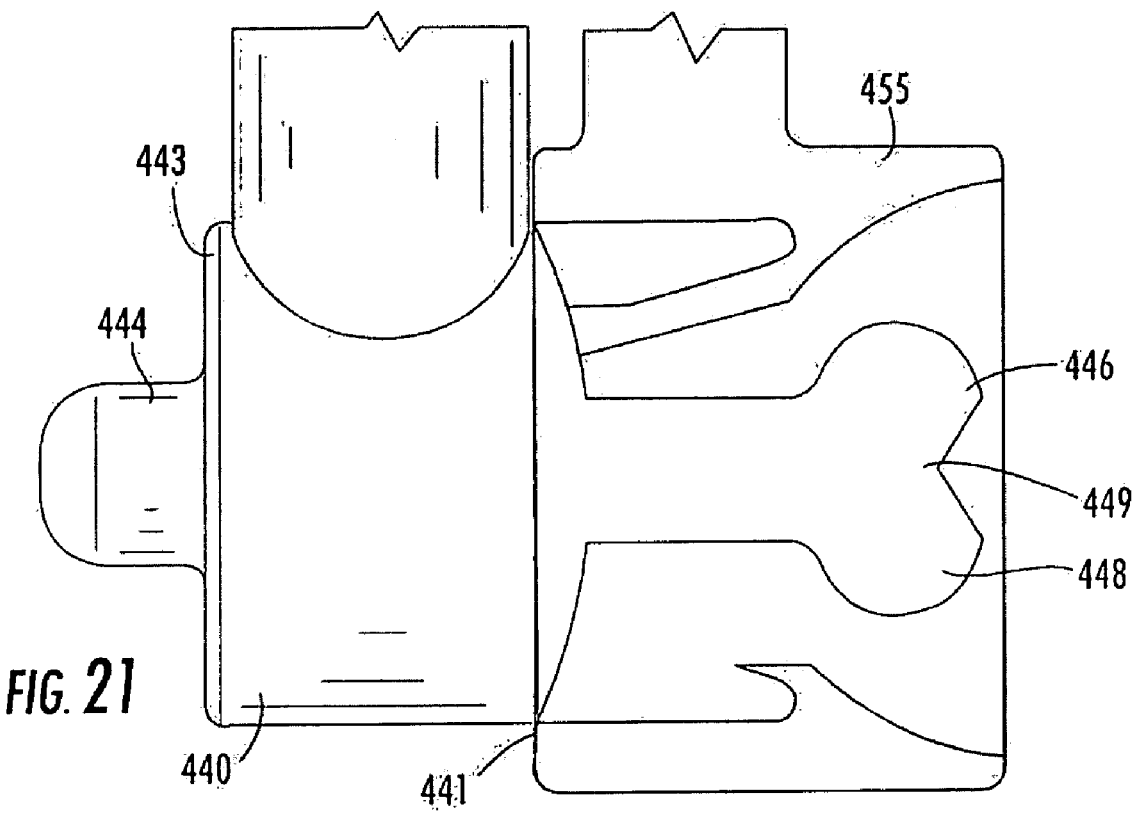
FIG. 21 is a schematic cutaway plan view of a coupler and a lead or contact provided in a connector according to another exemplary embodiment.

According to an exemplary embodiment (see, e.g., FIGS. 21-22), the base has a rear or back surface 441 that is generally convex. According to alternative embodiments, the rear surface may be generally planar (see, e.g., FIG. 16) or concave.

According to an exemplary embodiment, the contact (e.g., contact 440) includes a member or element in the form of a protrusion or extension (e.g., shown as a generally cylindrical shaped member 444 having a rounded end portion) extending from front or forward surface 443 of base 442 for coupling to a terminal or bushing of a battery. Protrusion 444 has a size and shape configured for insertion into an opening or aperture provided in a terminal of a battery (e.g., a bushing type terminal). According to an exemplary embodiment, protrusion 444 has a relatively smooth surface. According to an other exemplary embodiments, the protrusion may be provided with threads or other features configured to mate or adapt to features provided in an aperture provided in a battery terminal.

According to another exemplary embodiment, while the protrusion is shown as having a generally cylindrical shape (e.g., having a generally circular transverse cross-sectional shape), the protrusion may be provided as having alternative shapes (e.g., the transverse cross-section may be relatively oblong or football shaped, as with ¼ or ½ turn fasteners, etc.). The protrusion may be provided to have any shape suitable for mating or engaging a battery terminal or bushing.

According to an exemplary embodiment, contact 440 includes a member in the form of an extension or protrusion 446 (e.g., a projection) extending from back or rear surface 441 of base 442 of contact 440 and configured for coupling contact 440 to member 420 (e.g., by positioning the protrusion in a coupler). According to an exemplary embodiment, protrusion 446 includes a shaft or elongated member 447 and an enlarged portion 448 (e.g., shown in the form of a knob or ball in FIG. 16).

Enlarged portion 448 may have a size and shape configured for being retained within a structure or member (e.g., a coupler 452) provided on arm 426 of member 420 (e.g., it may have a larger size (e.g., diameter) than the shaft such that the enlarged portion may be secured within the coupler, etc.). According to an exemplary embodiment, the enlarged portion includes an opening or depression 449 (see, e.g., FIGS. 21-22) provided in an end thereof (e.g., to reduce the amount of material required to produce the knob or ball). According to another exemplary embodiment, no opening or depression is provided in the enlarged portion. According to another exemplary embodiment, the contact may lack a protrusion of the type described and may be coupled to the member by fasteners (e.g., screws, rivets, bolts, adhesives) or by other means.

A device or element in the form of a coupler or coupling device (see, e.g., coupler 452 in FIG. 14) is connected to or provided on an arm (e.g., arm 426) for securing or coupling the contact or lead (e.g., contact 440) to the member (e.g., member 420).

According to an exemplary embodiment, coupler 452 is provided with prongs or "fingers" 454 (see, e.g., FIGS. 21-23) to secure contact 440 to coupler 452. Fingers 454 may be made of a relatively resilient and/or flexible material such that the they bend or flex outward when enlarged portion 448 of protrusion 446 from contact 440 is inserted into coupler 452 (e.g., from the left as viewed in FIG. 22).

Fingers 454 are configured to secure contact 440 to coupler 452 such that the centerline of contact 440 (e.g., of protrusion 446) is aligned properly. Such arrangement provides for relatively constant electrical contact between the face of base 442 of contact 440 and the terminal or bushing of a battery.

Figure 24:
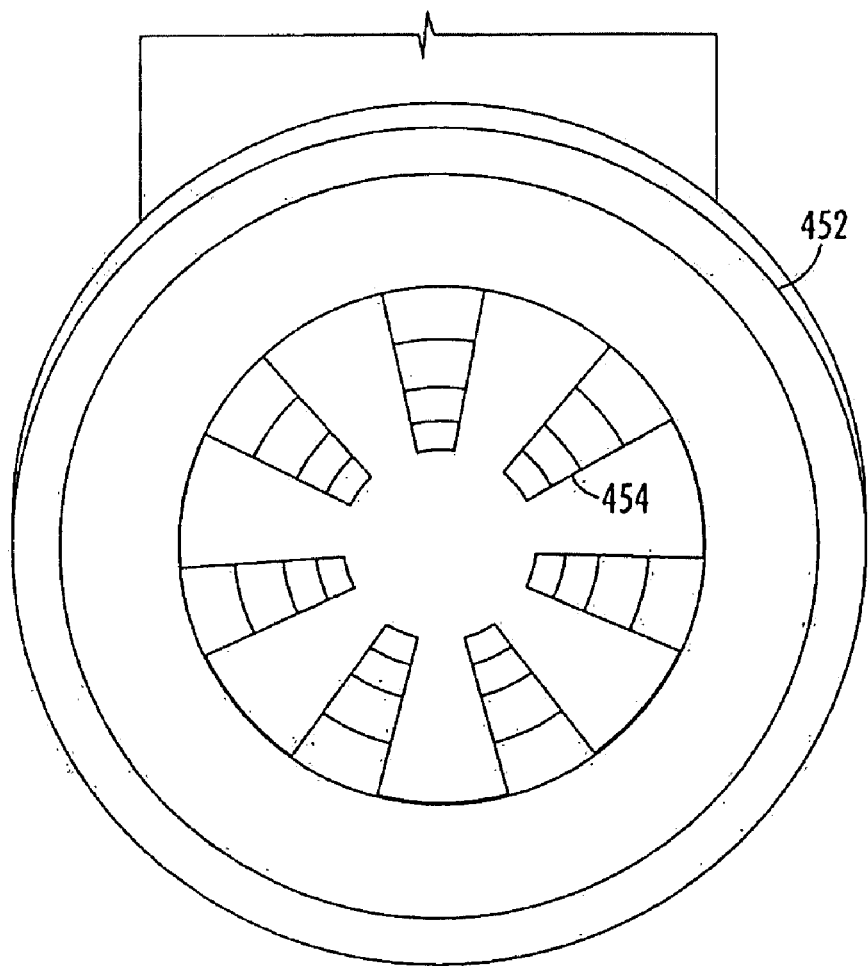
FIG. 24 is a plan view of the coupler shown in FIG. 22.
Figure 25:
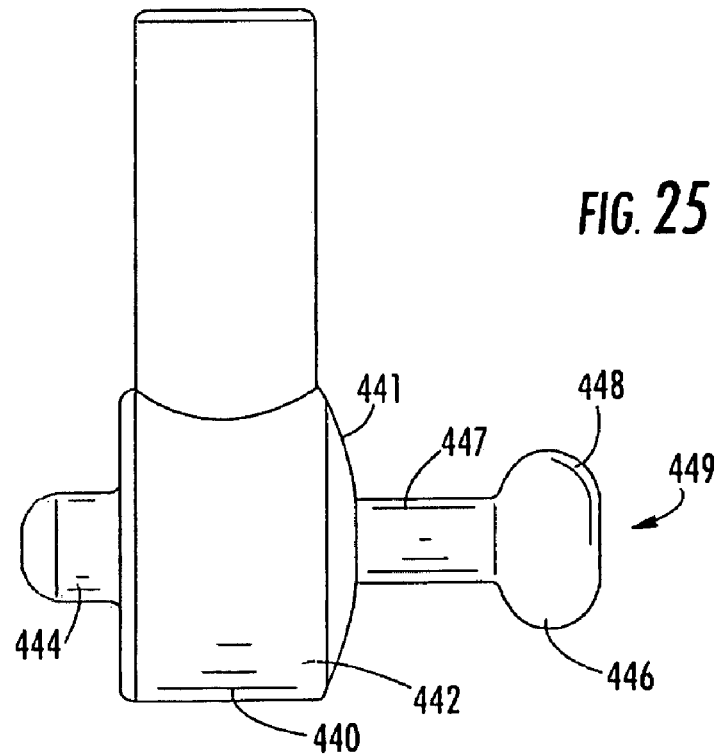
FIG. 25 is a plan view of a contact for use with the coupler shown in FIG. 22.

The size, shape, and configuration of the prongs or fingers may differ according to various exemplary embodiments. According to an exemplary embodiment, seven prongs or fingers are provided circumferentially about an opening formed in the coupler (see, e.g., FIG. 24). According to other exemplary embodiments, a different number of prongs or fingers may be provided.

According to one exemplary embodiment, the prongs or fingers have a surface (labeled as reference numeral 453 in FIG. 16) configured to secure the protrusion within the coupler by abutting the enlarged portion or knob of the protrusion. Such abutment may act to prevent the contact from sliding out of the coupler. Such configuration may be used, for example, in situations where the rear or back surface of the base of the contact has a relatively planar or concave configuration.

According to another exemplary embodiment, the prongs or fingers have a surface (labeled as reference numeral 455 in FIG. 21) configured to secure the protrusion within the coupler by abutting the back or rear surface of base of the contact. For example, the prong or finger may be angled such that it contacts the rear surface of the base of the contact at a position such that the knob or enlarged portion of the protrusion is secured within the coupler (see, e.g., FIG. 21, in which the finger abuts or contacts the rear surface of the base of the contact in such a manner that the knob is larger and cannot easily be removed from the coupler). Such a configuration may be desirable where the rear or back surface of the base of the contact has a relatively convex shape (e.g., extending into a concave aperture provided in the coupler and defined in part by the angled surfaces of the fingers or prongs).

Figure 22:
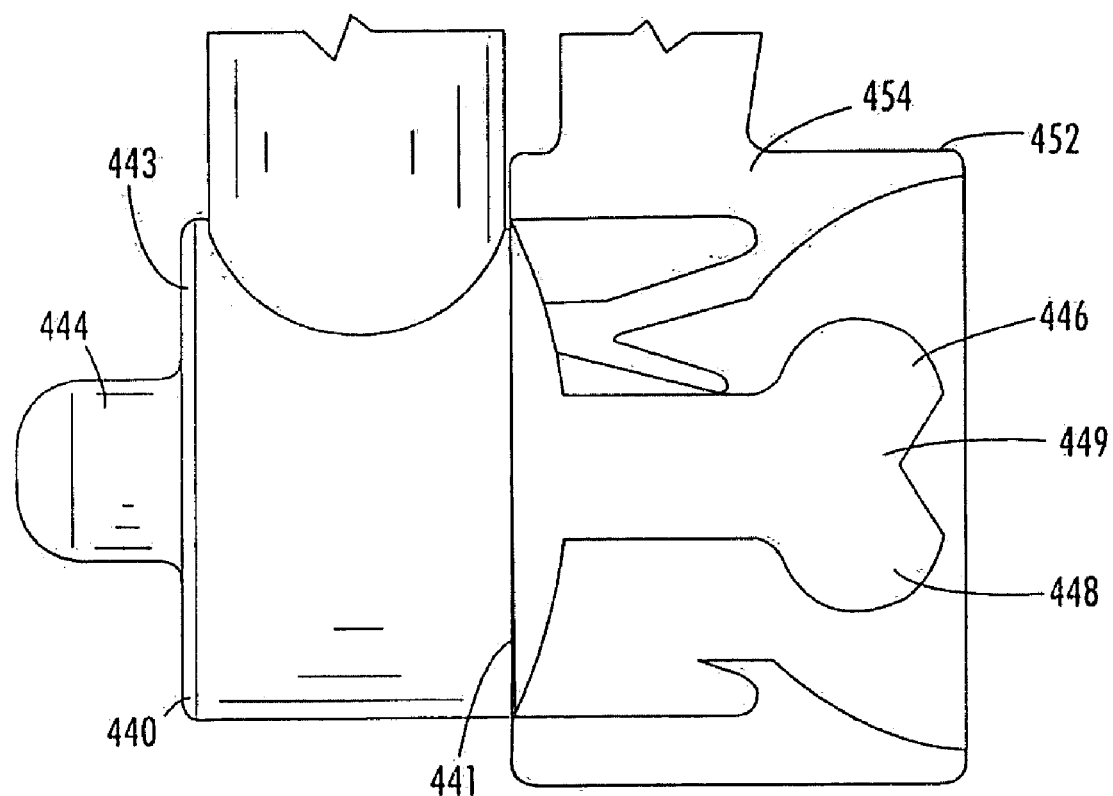
FIG. 22 is a schematic cutaway plan view of a coupler and a lead or contact provided in a connector according to another exemplary embodiment.
Figure 23:
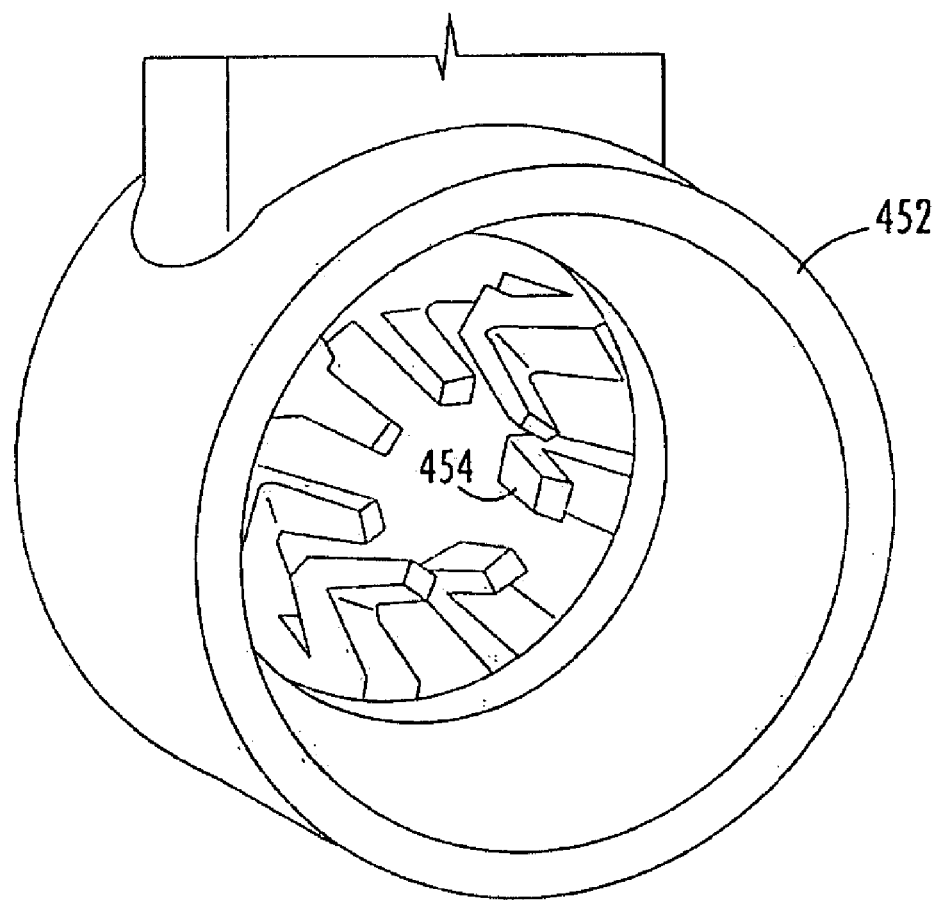
FIG. 23 is a perspective view of the coupler shown in FIG. 22.

According to yet another exemplary embodiment, the fingers or prongs are provided such that lateral movement of the contact (e.g., into and out of the coupler) are restricted. As shown in FIG. 22, the fingers or prongs have a shape similar to the letter "Y", with the base or bottom portion of the "Y" in abutment or contact with the rear or back surface of the base of the contact, one of the arms provided to restrict movement of the protrusion (e.g., by abutting or contacting the knob if the protrusion moves out of the coupler) and to abut with or contact a portion of the shaft, and the other of the arms coupled to the remainder of the coupler (e.g., integrally molded or secured thereto). By abutting or contacting both the rear surface of the base of the contact and the shaft, the fingers or prongs act to restrict the movement of the contact and to keep the contact aligned along its centerline (e.g., central longitidinal axis). Such a configuration may be desirable where the rear or back surface of the base of the contact has a relatively convex shape (e.g., extending into a concave aperture provided in the coupler and defined in part by the angled surfaces of the fingers or prongs).

According to various other exemplary embodiments, the size, shape, and configuration of the prongs or fingers may differ from those shown in the FIGURES without departing from the scope of the inventions as described herein.

The coupler and protrusion are configured to allow the contact to have a limited range of motion when coupled to the coupler. This range of motion allows for a good electrical connection between the contact and the terminal while the member is in a variety of positions relative to the battery. Also, the range of motion and the flexible nature of the member allows the same system to be used with batteries of various sizes (see, e.g., FIG. 20 where the same system is used to couple three batteries 90, 92, and 94, each battery being of a different size (i.e., the distance between the side provided with a terminal and the side opposite thereto is different for each of the three batteries)).

The components or features of the members may be integrally formed or produced separately and coupled or connected together. According to an exemplary embodiment, the handle portion (i.e., top portion, bottom portion, and bridge), projections, arms, coupler, and brace are integrally formed from a single material. According to an exemplary embodiment, at least one of the handle portion (i.e., top portion, bottom portion, and bridge), projections, arms, coupler, and brace are formed from a different material than the other components.

According to an exemplary embodiment, at least one of the top portion, bottom portion, and one or both of the arms are made of a relatively resilient and/or flexible material. The distance between the brace (e.g., brace 434) and the contact (e.g., base 442 of contact 440) is intended to provide relatively secure fitment on a variety of batteries having different sizes. Such distance is sometimes referred to as the "harp opening." According to an exemplary embodiment, the harp opening is between approximately 7.213 and 7.274 inches.

According to an exemplary embodiment, the top portion, bottom portion, and arms comprise the same material. According to an another exemplary embodiment, at least one of the top portion, bottom portion, and arms comprise different materials (e.g., one or both of the arms comprise a relatively flexible and/or resilient material and the top portion and bottom portion comprise a relatively rigid and/or inflexible material).

According to an exemplary embodiment, the top portion, bottom portion, and arms are made of a material comprising polypropylene and between approximately 10 and 30 percent glass (e.g., glass fibers). According to another exemplary embodiment, one or more of the top portion, bottom portion, and arms are made of a different material (e.g., another polymeric, metal, or other type of material suitable for use in a battery manufacturing environment).

To couple the member (e.g., member 420) to a battery (e.g., a lead-acid battery having side terminals), the arm having a contact provided thereon is provided on the battery such that the contact abuts or is coupled or connected to a battery terminal and the other arm is secured or compressed against another surface of the battery (e.g., the opposite side of the battery as the terminals). According to an exemplary embodiment, one arm is provided adjacent a first side of the battery and the other arm is provided adjacent a second side of the battery (e.g., the opposite side of the battery in relation to the side of the battery having a terminal provided thereon).

According to an exemplary embodiment, when the member is coupled to a battery, the top portion and bottom portion of the member extend over the top of the battery and are substantially parallel to the top of the battery, while the arms of the member are substantially parallel to the front and back of the battery, respectively. According to alternative embodiments, the configuration of the arms and top and bottom portions may differ (e.g., at least one of the top portion and bottom portion may not be parallel to the top surface of the battery, at least one of the arms may not be parallel to a surface of the battery, etc.).

Members 420, 460 are coupled together by a wire or cable 450 that couples or connects the contacts provided on each of the members together (e.g., to form an electrical connection between the two contacts to allow current flow between the contacts). Wire or cable 450 may have a cladding provided thereon in the form of a rubber, plastic, or other electrically insulative material.

According to an exemplary embodiment, wire 450 extends substantially perpendicular from the central longitudinal axes of contacts 440, 480. According to alternative embodiments, wire 450 may be connected to the contacts in other ways (e.g., may be coupled to the knob or ball provided within the coupler, etc.).

According to an exemplary embodiment (see, e.g., FIG. 13), members 420, 460 may include features (e.g., shown as channels or cutouts provided in projections or protrusions extending from the top surface of the members) for routing wire 450 (e.g., channels 433, 473). According to other exemplary embodiments, no such features are provided on the members for routing the wire.

Figure 14:
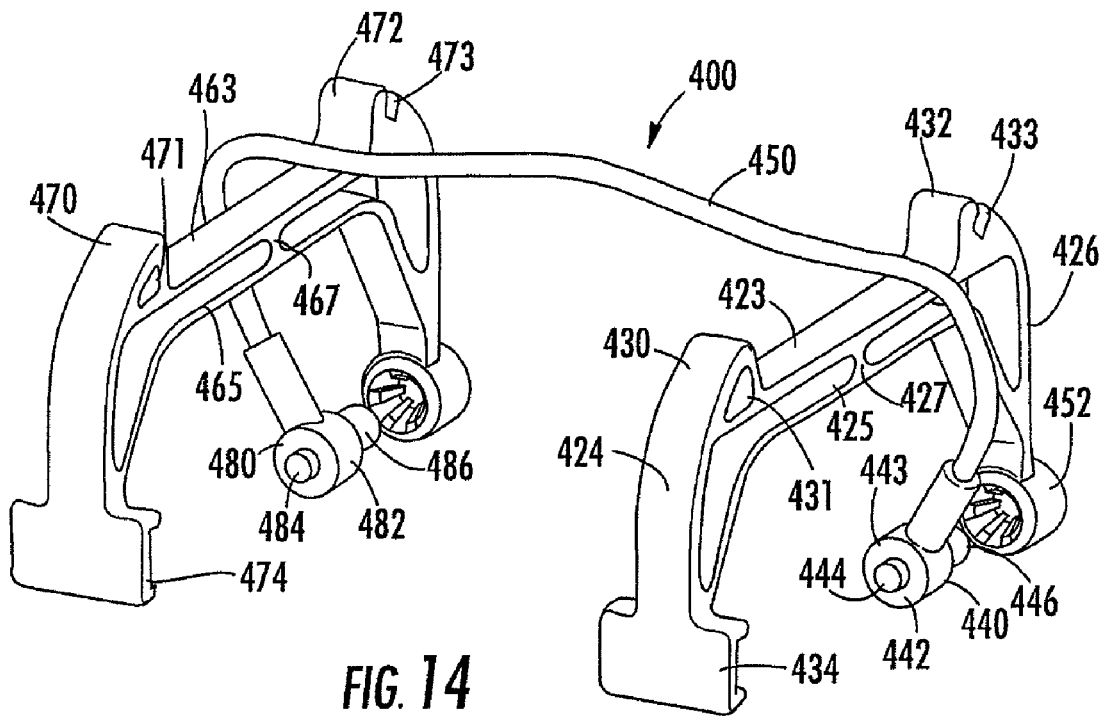
FIG. 14 is a partially exploded perspective view of the connector shown in FIG. 13 showing contacts or leads removed from couplers provided on the connector.
Figure 15:
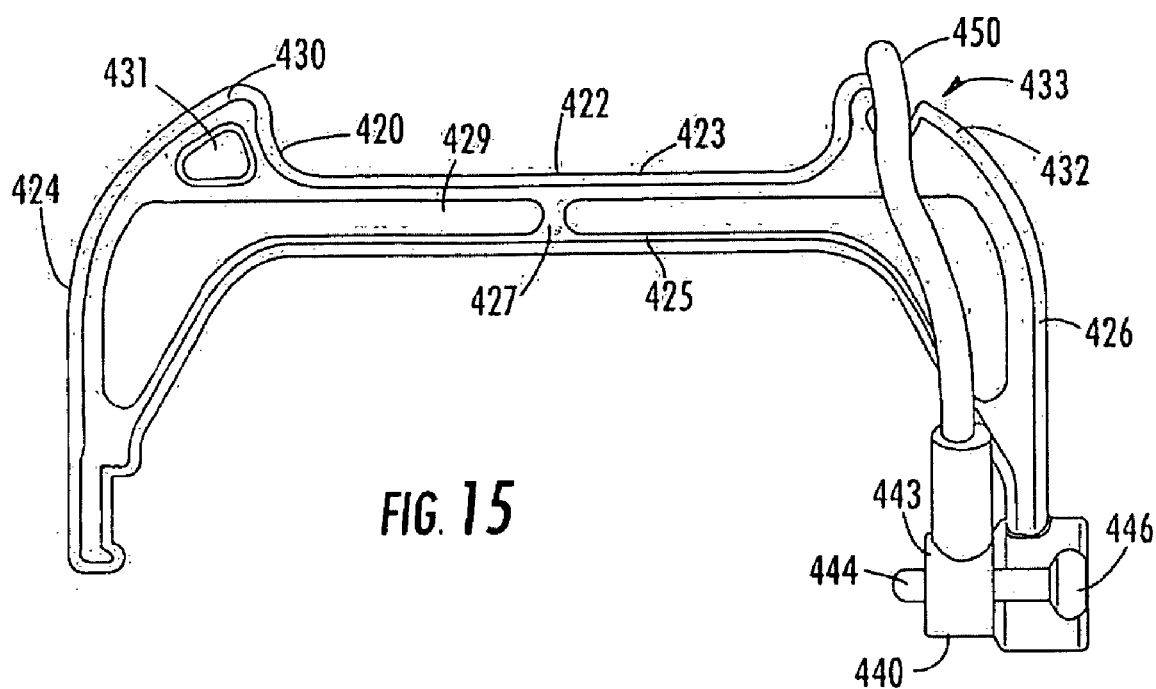
FIG. 15 is a schematic plan view of a portion of the connector shown in FIG. 13.
Figure 17:
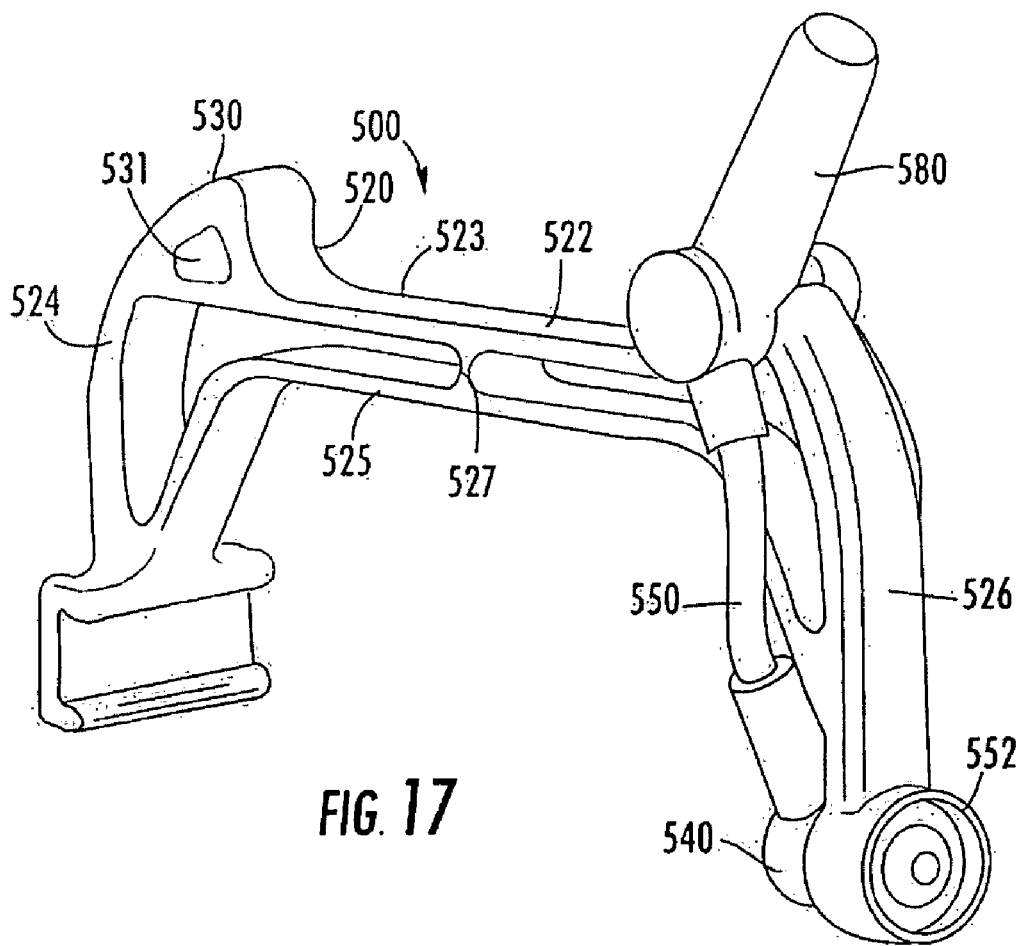
FIG. 17 is a perspective view of a connector according to another exemplary embodiment.
Figure 18:
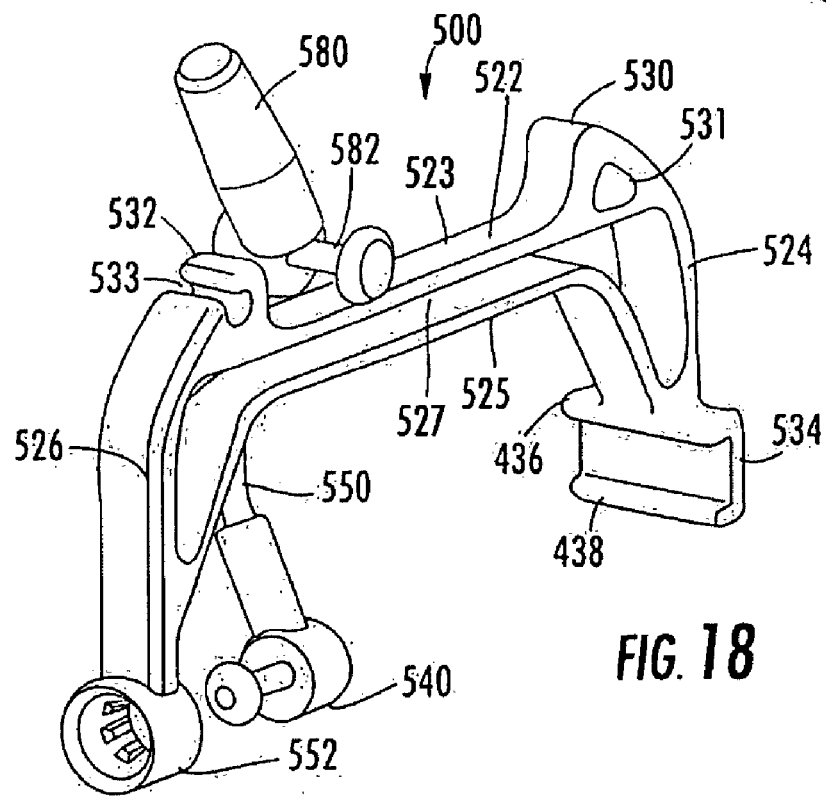
FIG. 18 is a partially exploded perspective view of the connector shown in FIG. 17 showing a contact removed from a coupler provided in the connector.
Figure 19:
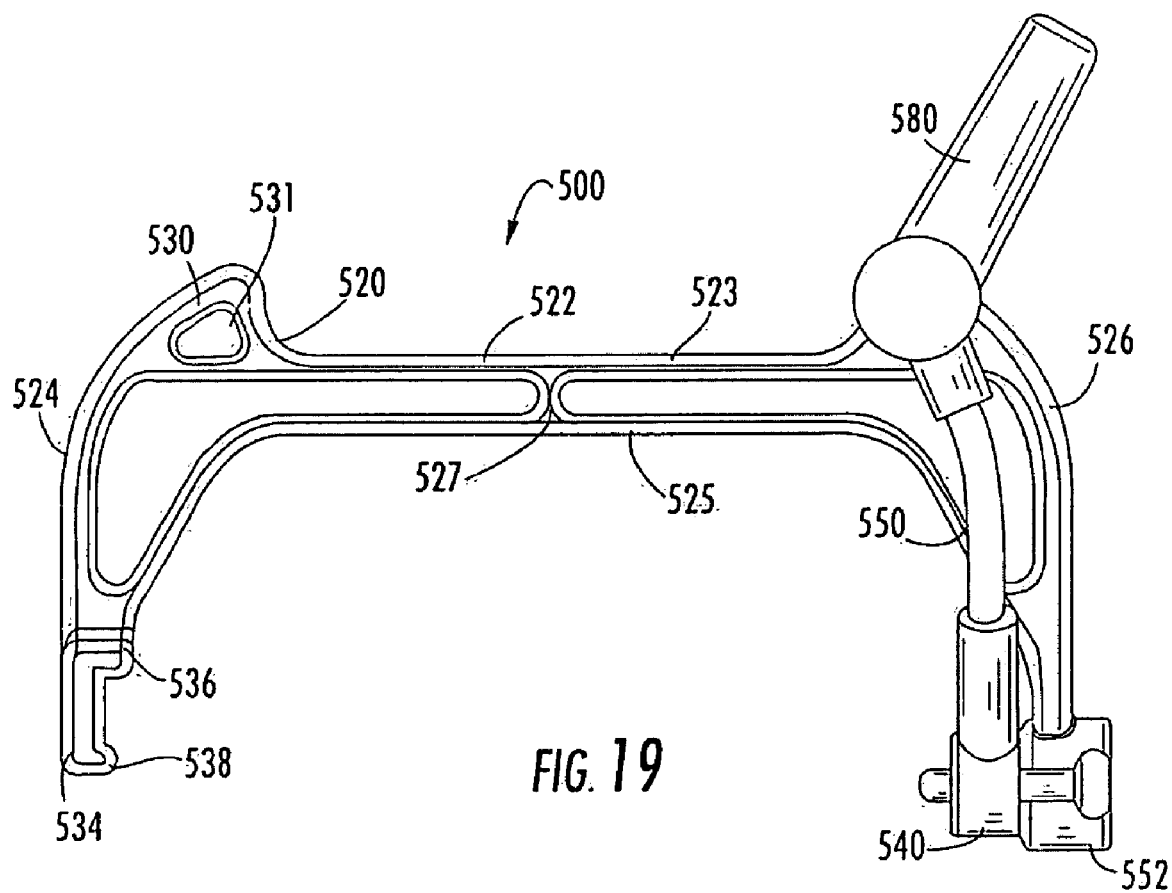
FIG. 19 is a schematic plan view of the connector shown in FIG. 17.
Figure 20:
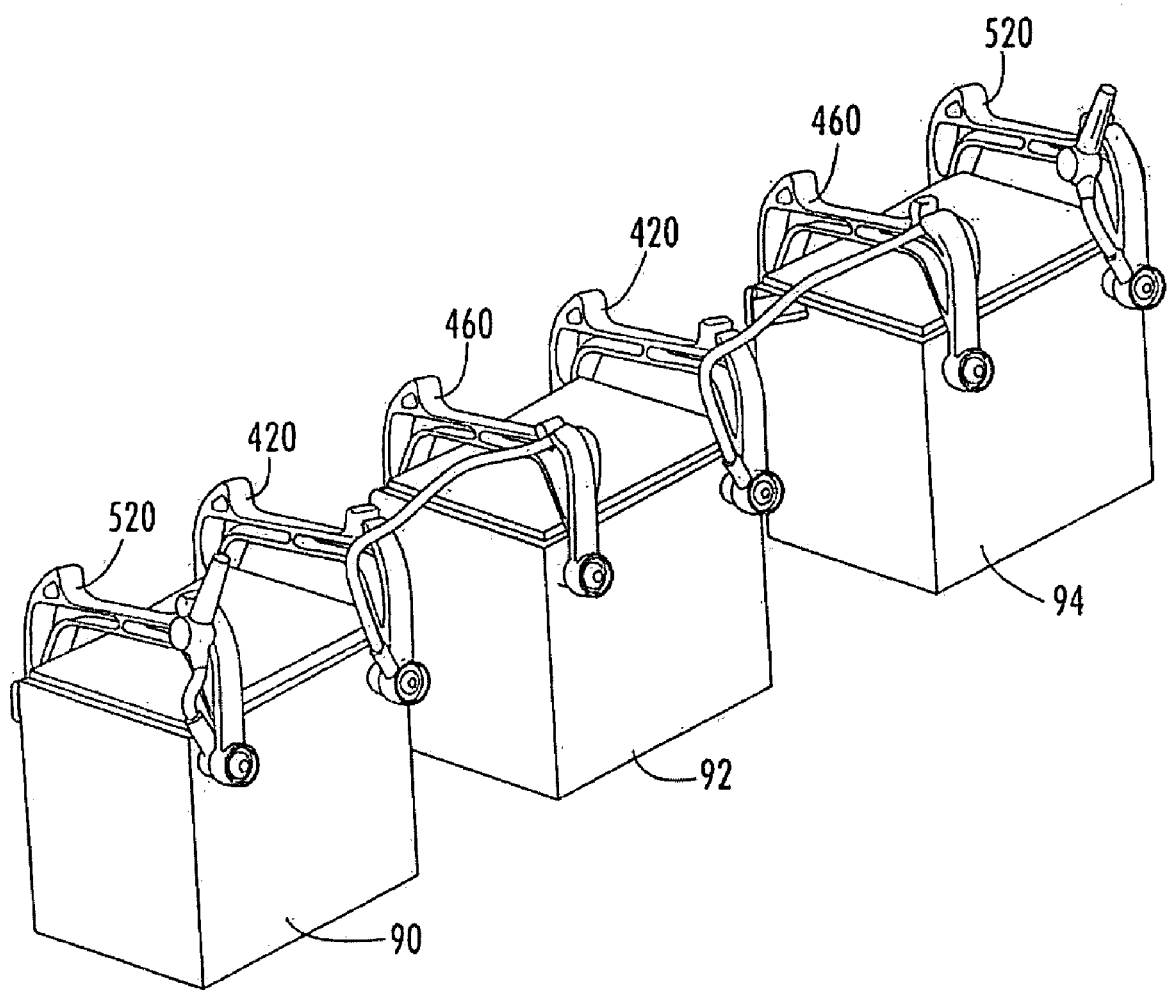
FIG. 20 is a perspective view showing a plurality of batteries electrically coupled together in a battery formation operation utilizing a plurality of connectors (i.e., using connectors similar to those shown in FIG. 13 in conjunction with connectors similar to those shown in FIG. 17).

While FIGS. 13-14 illustrate a system 400 for electrically connecting terminals of adjacent batteries together during battery charging and/or testing, FIGS. 17-19 illustrate a system 500 (e.g., a connector such as an end connector) configured for connecting a series of batteries to a charging or recharging device (e.g., a battery charging system or charger) (see e.g., FIG. 20).

Connectors 500 includes a member 520 (similar to the member previously described) for securing connector 500 to a battery, and includes a handle portion 522 having a top or upper portion 523, a lower or bottom portion 525, and a bridge 527 connecting the upper and lower portions. Member 520 also includes arms 524 and 526, a contact or lead 540, and an element for attaching the contact to the member (e.g., a coupler) (see, e.g., FIG. 7). A protrusion 530 having an aperture or void 531 provided therein extends from member 520 away from top portion 523, and a protrusion 532 having a channel 533 extends from member 520 away from top portion 523 on the opposite side of handle portion 522. A brace 534 including an extension 436 and a base 438 is provided on arm 524.

Connector 500 includes a post 580 similar to post 180 described above for electrically coupling the group of batteries to a charging or recharging device via a wire or cable 550 (see, e.g., FIG. 17). According to an exemplary embodiment, the post is made of a material comprising lead or a lead alloy.

According to an exemplary embodiment, the post has a size and shape configured for coupling to a connector of the charging or recharging device (e.g., a "ring-type" connector configured to receive at least of a portion of the post therein). Other configurations for the post may be provided depending on the particular type of connector used with the charging or recharging device.

According to an exemplary embodiment, the post is oriented substantially vertically (e.g., extending above the top portion of the member) and is coupled to projection 532 on the arm which is generally parallel to the terminal (front) side of the battery. Post 580 is secured (e.g. clamped) to projection 532. A protrusion or segment 582 extending from post 580 fits within channel 533 provided in projection 532 (see, e.g., FIG. 17). According to another exemplary embodiment, the post may be coupled to the arm or to another potion of the member. According to another exemplary embodiment, the post may be coupled to the member by a fastener or fasteners (e.g., a screw or a bolt, etc.).

According to an exemplary embodiment, wire 550 is provided to electrically couple post 580 to contact 540 to allow current to flow from the charging or recharging device to post 580 and to contact 540 through wire 550.

According to an exemplary embodiment, while attaching a member (e.g., member 420, 460, or 520, etc.) to or removing its from a group of batteries, a human operator may grasp a member at the handle portion (i.e., around the top portion and bottom portion between the projections). The projections act as stops to prevent the hand of the operator from sliding longitudinally along the member beyond a certain point. The projections may have other functions as well (e.g., routing cables, etc.).

The surfaces of the member where the operator grasps the member (e.g., the lower surface of the bottom portion) may be textured to improve the grip of the operator and further reduce any slipping. According to another embodiment, one or both of the top portion and the bottom portion may have a shape configured to reduce the occurrence of slippage of the operator's hand (e.g., the bottom portion may include a "grip" shape configured to receive the operator's fingers). According to another exemplary embodiment, the members may be attached to or removed from a group of batteries utilizing a machine.

During charging and recharging operations, a plurality of batteries are electrically connected to each other and to a charging device such that each of the batteries is charged at the same time (e.g., charge flows from the charging device through each of the batteries) (see, e.g., FIG. 20). According to an exemplary embodiment, 15 to 20 batteries are connected in series. According to other exemplary embodiments, a greater or lesser number of batteries are connected to accommodate various charging and recharging devices.

The members (e.g., each having a top portion, bottom portion, brace, bridge, coupler, and a pair of arms) comprise any material (e.g., polymeric materials such as polyethylene or polypropylene) that is suitable for use in a battery manufacturing (e.g., acid-containing) environment. The polymeric material may also be relatively flexible and/or resilient. According to an exemplary embodiment, at least one of the components of the member comprises a material including polypropylene and glass (e.g., between approximately 10 and 30 percent glass).

According to one exemplary embodiment, the top portion, bottom portion, arms, bridge, and coupler of each member are integrally formed from a single material. According to another exemplary embodiment, one or more of these components is formed from a different material and/or is produced separately and coupled to the other components using a fastener or other means.

Channels, voids, and apertures provided or formed in the member (e.g., in the form of a groove, slot, aperture, or other structure) are made by use of a mold (e.g., injection molding around a portion of a mold configured to provide an aperture or other structure in a molded part) or by removing material from a solid piece.

The contacts comprise any suitable conductive metal (e.g., lead or lead alloys), and the wire or cable between the contacts may be copper, lead, or another conductive material.

According to a preferred embodiment (see, e.g., FIG. 1), the system is comprised of materials and/or has a construction that is intended to suitably withstand the effects of a manufacturing environment that may include acids, voltage, and other elements that may promote corrosion.

To couple the members of the connector to batteries, a contact provided on one of the members is aligned with a bushing or terminal on a first side of a battery. A force is then be applied to the member whereby at least a portion of the member is flexed such that the opposite arm of the member is secured to the back side of the battery. According to another exemplary embodiment, the members are attached to the back of the batteries (e.g., the side opposite the battery terminal) before the contact is attached to the terminal. While attaching the connector to or removing the connector from a group of batteries, a human operator may grasp the connector by hand around the handle portion (i.e., top portion and bottom portion) between the projections. The projections act as stops to prevent the hand of the operator from sliding longitudinally along the member. The surfaces of the member where the operator would grasp the member may be textured or may include other features to improve the grip of the operator and further reduce any slipping.

The process is then repeated such that the second contact in the second member of the connector is coupled to an oppositely-charged bushing or terminal of another battery, thus connecting the two batteries in series.

When the connector is coupled to a pair of batteries (or multiple systems are used to couple more than two batteries in series), all the battery terminals are coupled to a contact, such that the batteries are connected in series (e.g., the positive terminal of one battery is coupled to the negative terminal of an adjacent battery), except for the positive terminal of a battery at one end of the group, and the negative terminal of a battery at the other end of the group. According to an exemplary embodiment, 15 to 20 batteries are so connected in the formation process. According to alternative embodiments, a greater or lesser number of batteries are so connected to accommodate various charging and recharging devices.

An end connector is coupled to the positive terminal of a battery at one end of the group of batteries, and another end connector is coupled to the negative terminal of a battery at the other end of the group. Such end connectors may be used to couple the battery group to a charging or recharging device. Such connectors include a member for securing the connector to a battery, an electrical contact, and an element (e.g., a coupler) for attaching the contact to the member similar to those disclosed above. Such connectors also include a post to electrically couple the group of batteries to a charging or recharging device via one or more wires or cables.

According to an exemplary embodiment, the post is oriented substantially vertically and coupled to a projection provided on the member. The post is secured (e.g., clamped) to the projection. A segment extending from the post fits within a channel provided in the projection. According to another exemplary embodiment, the post may be coupled to the member by a fastener or fasteners (e.g., a screw, bolt, etc.). The post may be oriented horizontally or at another angle to accommodate various production lines and facilities. According to another exemplary embodiment where the member is made of a conductive material, an insulating material is used to separate the member and the post. The posts of the connectors then provide points at which a charging or recharging device may be electrically coupled to the group of batteries.

According to another exemplary embodiment, the system does not have connectors (e.g., end connectors) for coupling to the charging or recharging device. Rather, the charging or recharging device is coupled directly to the two open terminals of the battery group (e.g., by a wire or other device).

The sequence in which the devices to secure the connector and terminal connectors to the battery are attached to the battery may be varied. The operation of attaching the connectors to the batteries may be carried out by a human operator or by a machine.

The system is intended to provide a relatively efficient and convenient connector for use in a manufacturing facility. The system includes members that may be connected to and disconnected from batteries in a relatively quick and easy manner, which is intended to provide increased manufacturing efficiency.

Additional structural elements may be provided to provide enhanced structural rigidity for a system (e.g., a connector such as a battery formation connector). For example, FIGS. 26-29 show a system 600 in the form of a connector such as a battery formation connector that includes a handle portion 622 that includes a top or upper portion 623, a bottom or lower portion 625, and a bridge 627 connecting top portion 623 and bottom portion 625. System 600 includes arms 624 and 626 and projections 630, 632 extending from top portion 623. A brace or bracket 634 including an extension 636 and a base 638 is provided on arm 624.

To provide enhanced structural rigidity, webs of material are used in system 600. For example, webs 628, 629 are provided adjacent bridge 627 between top portion 623 and bottom portion 625. A web 631 is provided in an aperture defined by protrusion 630, and a web 643 is provided in an aperture defined by protrusion 632. Additional webs 625 and 641 are also provided in areas where components of member 620 come together.

Figure 30:
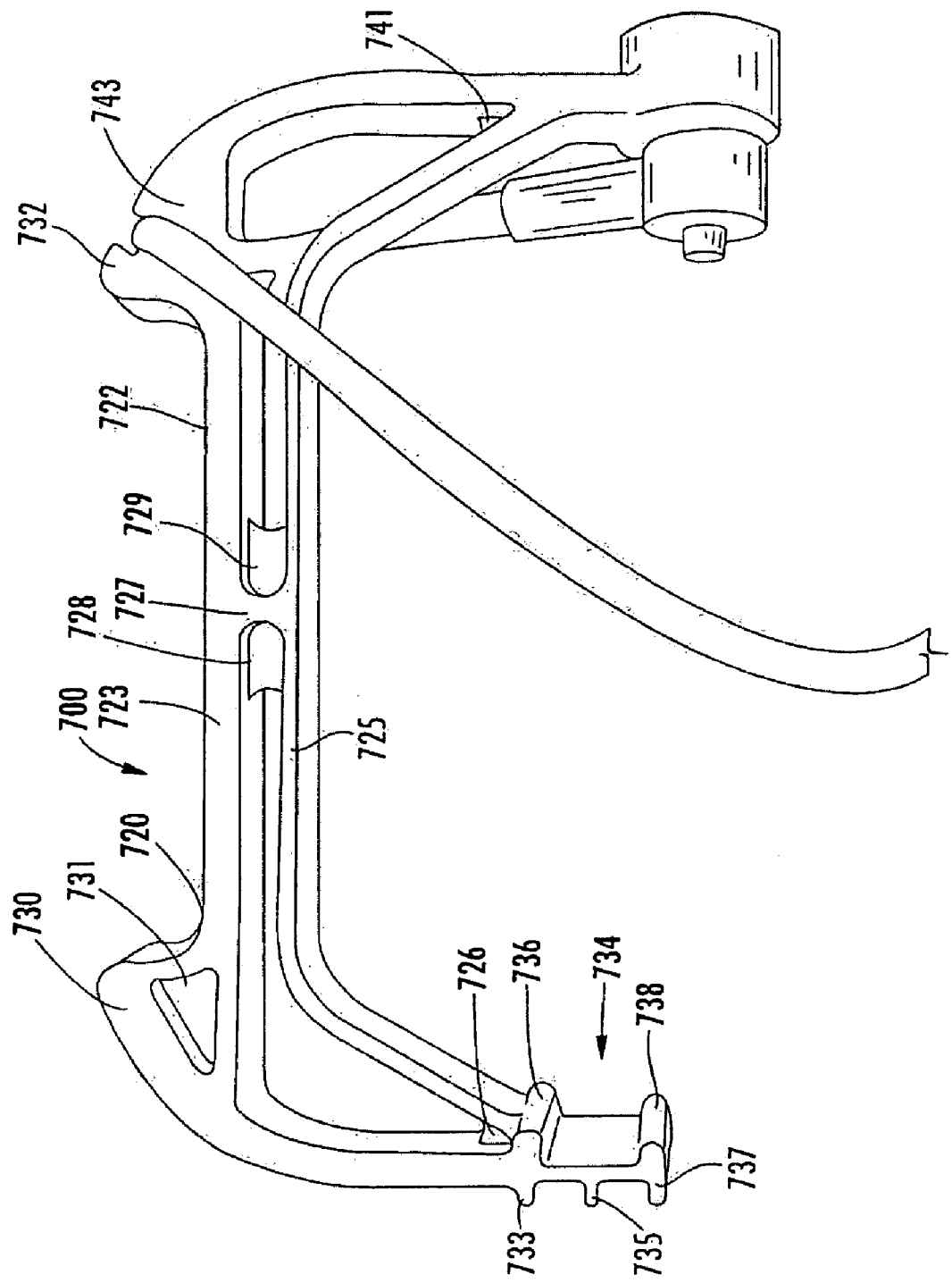
FIG. 30 is a plan view of a connector according to another exemplary embodiment.

Similarly, FIGS. 30-31 show a system 700 having a member 720 that includes webs 728 and 729 provided adjacent a bridge 727 connecting a top portion 723 and a bottom portion 725 of a handle portion 722, a web 731 provided in an aperture defined by a protrusion 730 and a web 743 provided in an aperture formed by a protrusion 732, and webs 726, 741 formed in regions where other components of member 720 come together.

According to an exemplary embodiment, the thickness of the various webs provided in members 620 and 720 have a thickness of between approximately 0.18 and 0.22 inches. Such thickness is less than the depth of the component to which the webs are adjacent (e.g., the thickness of web 628 is less than the width of top portion 623, bottom portion 625, and bridge 627, with the thickness being taken between the front of member 620 shown in FIG. 26 to the back of member 620 shown in FIG. 29). The size, shape, thickness, and configuration of the various webs may differ according to other exemplary embodiments without departing from the scope of the inventions described herein. According to an exemplary embodiment, each of the webs has a substantially identical thickness. According to another exemplary embodiment, one or more of the webs may have a different thickness than other webs provided in a particular member. Webs are intended to provide enhanced structural rigidity and strength for the various members.

Figure 26:
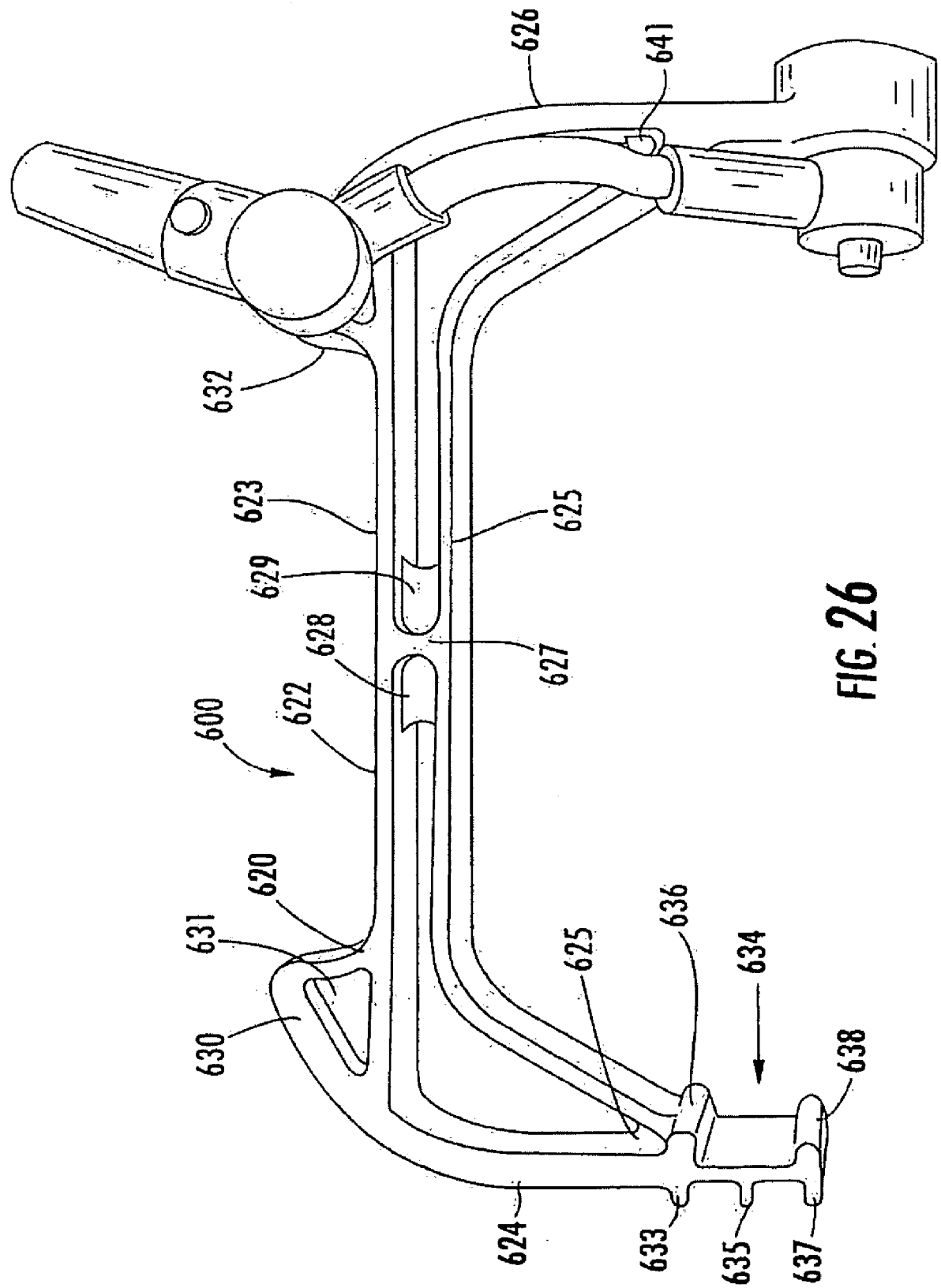
FIG. 26 is a plan view of a connector according to another exemplary embodiment.
Figure 28:
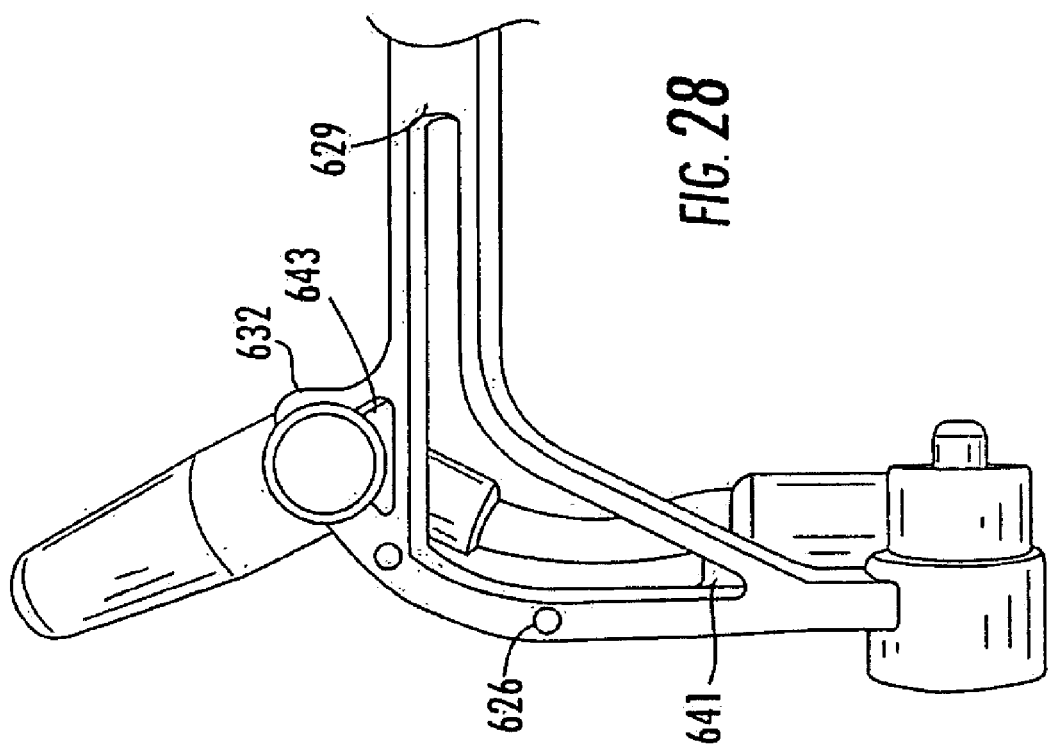
FIG. 28 is a plan view of a portion of the connector shown in FIG. 26.
Figure 27:
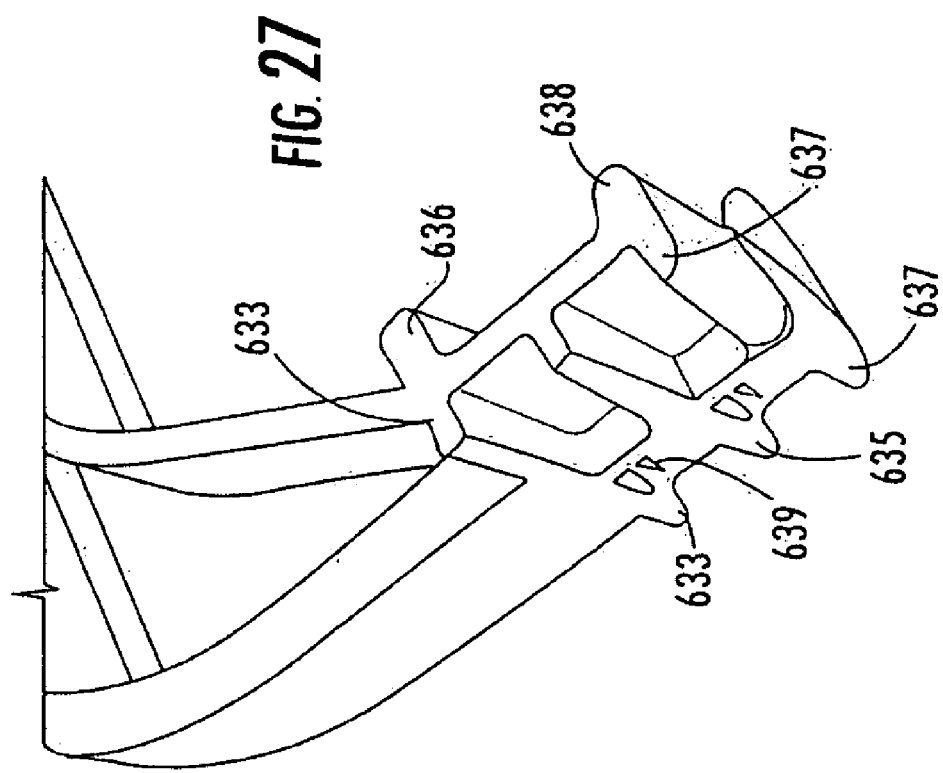
FIG. 27 is a perspective view of a portion of the connector shown in FIG. 26.
Figure 29:
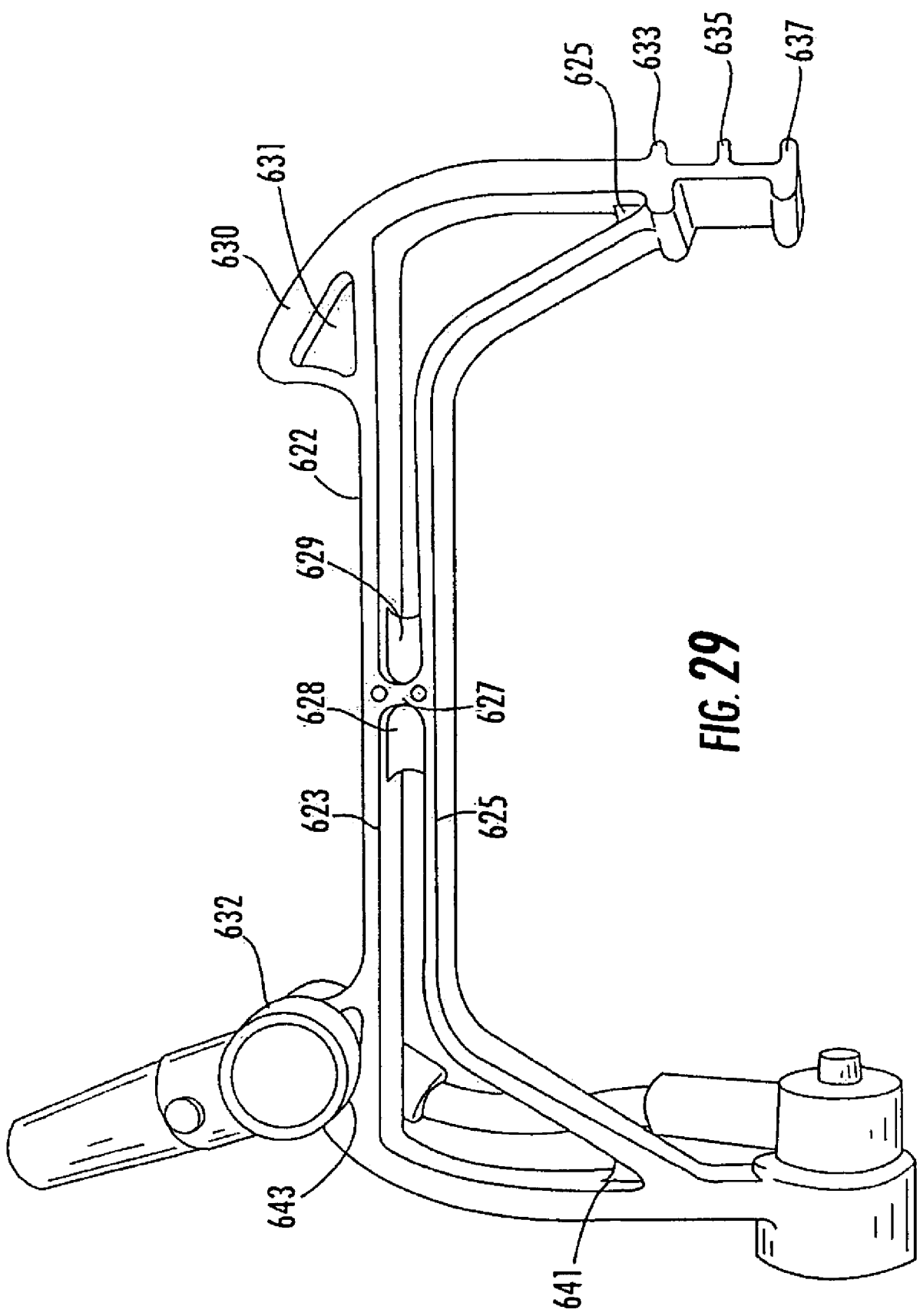
FIG. 29 is another plan view of a connector according to another exemplary embodiment.

Other features such as ribs or extensions may also be provided to provide enhanced structural rigidity and strength for the various members. For example, as shown in FIGS. 26-27, a brace 634 not only includes an extension 636 and a base 638, but also includes a number of ribs 633, 635, 637, and 639 intended to provide enhanced structural rigidity and strength for member 630. Similarly, a brace 734 shown in FIGS. 30-31 includes an extension 736 and a base 738, as well as ribs 733, 735, 737, and 739. The number, size, shape, and configuration of the various ribs may vary according to various other exemplary embodiments.

It should be noted that features shown and/or described with respect to one or more embodiments may be included in other embodiments. For example, the webs shown and described with respect to FIGS. 26-31 may be included in any of the variety of embodiments (e.g., extending between top portion 22 and arm 24 in the embodiment shown in FIG. 1, etc.). In another example, couplers such as those shown and described, for example, with respect to FIG. 22 may be used in place of member 36 shown in FIG. 1. Those of ordinary skill in the art will appreciate that various other configurations may be possible according to a variety of other exemplary embodiments.

It will be apparent to one of ordinary skill in the art that various advantages may be obtained using one or more of the embodiments described herein. For example, a system or connector (e.g., a formation connector) may be provided that can be coupled and decoupled to or from a battery with relative ease and convenience for an operator (e.g., in a relatively ergonomic or low-impact manner), such that an electrical connection is achieved between the connector and the terminal without the use of a threaded connection. Such connectors may also include features (e.g., protrusions from a handle portion) that prevent the hand of the operator from slipping in relation to the connector.

A coupler may be provided that allows movement (e.g., "play") between the contact and the formation connector so that an electrical connection may be maintained between the contact and the battery terminal with the structure of the connector in a variety of positions relative to the battery terminal. Such connectors may have a relatively simple design that is intended to be capable of relatively low-cost manufacturing, and may be constructed of materials and elements that are generally resistant to corrosion and/or degradation in the environment in which the connector is used.

According to an exemplary embodiment, a connector may be provided that reduces the time needed to connect a plurality of batteries during a charging/recharging application. The connector may allow for variable spacing between a plurality of batteries while coupled together, and/or may be used with a variety of batteries that are provided in a variety of sizes.

It is important to note that the construction and arrangement of the elements of the battery formation connector as shown and described in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements (e.g., the couplers may be produced separately and coupled to an arm of the member), the position of elements may be reversed or otherwise varied (e.g., the cable may be routed through features provided in projections extending from the member or may extend directly between the contacts without being routed through a feature in the member), and the nature or number of discrete elements or positions may be altered or varied (e.g., each connector may have more than two members, such as three or more members). It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

What is claimed is:

1. A device adapted for use in charging at least one battery comprising:

a member comprising a first portion, a first arm extending from the first portion, a second arm extending from the first portion, a contact coupled to the first arm and a brace provided on the second arm;

wherein the member is configured for coupling to a battery such that the contact engages a terminal provided on a first side of the battery, the second arm engages a second side of the battery, and the brace engages the second side of the battery and a top surface of the battery proximate the second side of the battery.

2. The device of claim 1 further comprising an electrically conductive wire coupled to the contact.

3. The device of claim 1 wherein the first portion comprises a handle.

4. The device of claim 3 wherein the handle comprises a first portion, a second portion generally parallel to the first portion, and a bridge approximately centrally located along the handle and extending between the first portion and the second portion within a generally parallel section of the first and second portions, the first and second portions being spaced apart on either side of the bridge.

5. The device of claim 1 wherein the member comprises a generally flexible material.

6. The device of claim 1, wherein the member is a generally U-shaped member.

7. The device of claim 4, further comprising a web on either side of the bridge, each web extending between the first portion, the bridge, and the second portion.

* * * * *